US012631826B2

(12) United States Patent
Schultz

(10) Patent No.: US 12,631,826 B2
(45) Date of Patent: May 19, 2026

(54) IMAGE LIGHT GUIDE WITH MULTI-WAVELENGTH IN-COUPLING DIFFRACTIVE OPTIC

(71) Applicant: Vuzix Corporation, West Henrietta, NY (US)

(72) Inventor: Robert J. Schultz, Victor, NY (US)

(73) Assignee: Vuzix Corporation, West Henrietta, NY (US)

( * ) Notice: Subject to any disclaimer, the term of this patent is extended or adjusted under 35 U.S.C. 154(b) by 234 days.

(21) Appl. No.: 18/279,826

(22) PCT Filed: Mar. 4, 2022

(86) PCT No.: PCT/US2022/018965
§ 371 (c)(1),
(2) Date: Aug. 31, 2023

(87) PCT Pub. No.: WO2022/187664
PCT Pub. Date: Sep. 9, 2022

(65) Prior Publication Data
US 2024/0134125 A1     Apr. 25, 2024
US 2024/0231004 A9     Jul. 11, 2024

Related U.S. Application Data

(60) Provisional application No. 63/156,523, filed on Mar. 4, 2021.

(51) Int. Cl.
G02B 6/34          (2006.01)
G02B 27/01         (2006.01)
(52) U.S. Cl.
CPC ........... G02B 6/34 (2013.01); G02B 27/0172 (2013.01)

(58) Field of Classification Search
CPC .............................. G02B 6/34; G02B 27/0172
See application file for complete search history.

(56) References Cited

U.S. PATENT DOCUMENTS 7,483,604 B2      1/2009  Levola
12,140,764 B2 *  11/2024  Popovich ............. G02B 6/0016
(Continued)

FOREIGN PATENT DOCUMENTS

CN          106338832 A      1/2017
CN          111665625 A      9/2020
(Continued)

OTHER PUBLICATIONS

Kato et al. (Oct. 2021) "Waveguide using HOE with image magnification," Institute of Image Information and Television Engineers Technical Report, JP, vol. 45 No. 29, 41-44.

*Primary Examiner* — Rhonda S Peace
(74) *Attorney, Agent, or Firm* — Harter Secrest & Emery LLP; Jacob D. Merrill, Esq.

(57)          ABSTRACT

An image light guide for conveying a virtual image including a substrate operable to propagate image-bearing light beams along a length thereof. An in-coupling diffractive optic is formed along the substrate and is operable to diffract image-bearing light beams from an image source into the substrate in an angularly encoded form. An out-coupling diffractive optic is formed along the substrate, wherein the out-coupling diffractive optic is operable to diffract the image-bearing light beams from the substrate in an angularly decoded form. The in-coupling diffractive optic has three pluralities of periodic diffractive structures symmetric about three equidistant axes and the out-coupling diffractive optic has two pluralities of periodic diffractive structures having a periodicity equivalent to two of the three pluralities of periodic diffractive structures of the in-coupling diffractive optic. The two pluralities of periodic diffractive structures of
(Continued)

the out-coupling diffractive optic are also parallel with two of the three pluralities of periodic diffractive structures of the in-coupling diffractive optic.

25 Claims, 18 Drawing Sheets

(56)                 References Cited

U.S. PATENT DOCUMENTS

| | | | |
|---|---|---|---|
| 12,399,326 B2 * | 8/2025 | Waldern | G02B 27/0172 |
| 2010/0284085 A1 | 11/2010 | Laakkonen | |
| 2018/0074340 A1 | 3/2018 | Robbins et al. | |
| 2018/0172995 A1 | 6/2018 | Lee et al. | |
| 2019/0369403 A1 | 12/2019 | Leister | |
| 2020/0116997 A1 * | 4/2020 | Lee | G02B 6/0076 |
| 2020/0159023 A1 * | 5/2020 | Bhargava | G06T 19/006 |
| 2020/0209630 A1 | 7/2020 | Schultz et al. | |
| 2020/0278543 A1 | 9/2020 | Schultz et al. | |
| 2023/0081473 A1 | 3/2023 | Borisov et al. | |
| 2024/0094456 A1 * | 3/2024 | Schultz | G02B 5/1819 |
| 2024/0134125 A1 * | 4/2024 | Schultz | G02B 5/1819 |
| 2025/0164794 A1 * | 5/2025 | Schultz | G02B 27/4272 |
| 2025/0199321 A1 * | 6/2025 | Fan | G06F 1/163 |

FOREIGN PATENT DOCUMENTS

| | | |
|---|---|---|
| CN | 111766704 A | 10/2020 |
| JP | 2015194549 A | 11/2015 |
| JP | 2017528739 A | 9/2017 |
| JP | 2017531840 A | 10/2017 |
| JP | 2019512745 A | 5/2019 |
| JP | 2020514783 A | 5/2020 |
| JP | 2020523634 A | 8/2020 |
| JP | 2023526430 A | 6/2023 |
| WO | 2016054092 A1 | 4/2016 |
| WO | 2017162999 A1 | 9/2017 |
| WO | 2018231754 A1 | 12/2018 |
| WO | 2021237168 A1 | 11/2021 |

* cited by examiner

IMAGE LIGHT GUIDE WITH MULTI-WAVELENGTH IN-COUPLING DIFFRACTIVE OPTIC

TECHNICAL FIELD

The present disclosure relates generally to electronic displays and more particularly to displays utilizing image light guides with diffractive optics to convey image-bearing light to a viewer.

BACKGROUND

Head-Mounted Displays (HMDs) and virtual image near-eye displays are being developed for a range of diverse uses, including military, commercial, industrial, fire-fighting, and entertainment applications. For many of these applications, there is value in forming a virtual image that can be visually superimposed over the real-world image that lies in the field of view of the HMD user. An optical image light guide may convey image-bearing light to a viewer in a narrow space for directing the virtual image to the viewer's pupil and enabling this superposition function.

Although conventional image light guide arrangements have provided significant reduction in bulk, weight, and overall cost of near-eye display optics, further improvements are needed. In some instances, the size of the eyebox is constrained, forcing HMD designs to limit tolerances for movement and device placement. Light can often be unevenly distributed over the visual field, leading to hot spots, such as higher levels of light within the center of the field and lower light levels within the field periphery. Beam management functions within the waveguide including beam expansion and light distribution functions can increase the size of waveguides as well as their manufacturing cost and complexity.

SUMMARY

In a first exemplary embodiment, an image light guide for conveying a virtual image includes a substrate operable to propagate image-bearing light beams along a length thereof. An in-coupling diffractive optic is formed along the substrate and is operable to diffract image-bearing light beams from an image source into the substrate in an angularly encoded form. An out-coupling diffractive optic is formed along the substrate, wherein the out-coupling diffractive optic is operable to diffract the image-bearing light beams from the substrate in an angularly decoded form. The in-coupling diffractive optic has three pluralities of periodic diffractive structures and the out-coupling diffractive optic has two pluralities of periodic diffractive structures having a periodicity equivalent to two of the three pluralities of periodic diffractive structures of the in-coupling diffractive optic. The two pluralities of periodic diffractive structures of the out-coupling diffractive optic are also parallel with two of the three pluralities of periodic diffractive structures of the in-coupling diffractive optic.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

DETAILED DESCRIPTION

Figure 1:
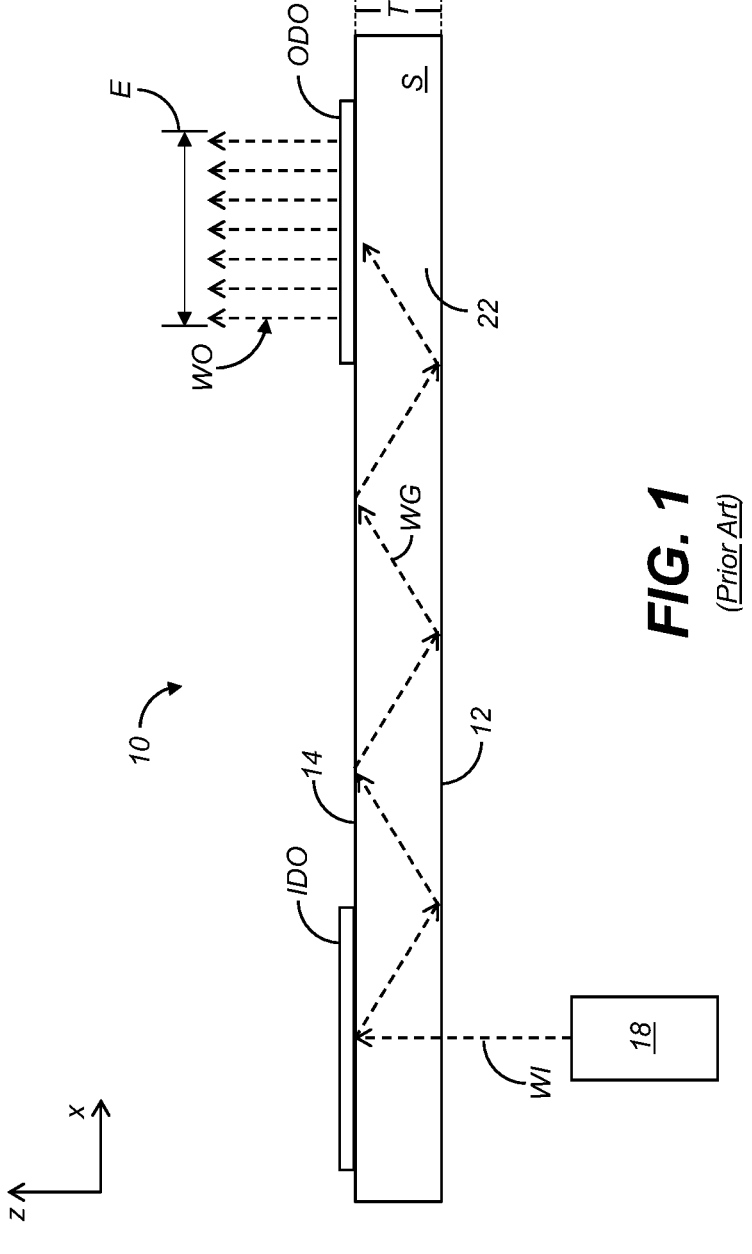
FIG. 1 shows a simplified cross-sectional view of an image light guide showing the expansion of an image-bearing beam along the direction of propagation for expanding one dimension of an eyebox.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Where used herein, the terms "first", "second", and so on, do not necessarily denote any ordinal, sequential, or priority relation, but are simply used to more clearly distinguish one element or set of elements from another, unless specified otherwise.

Where used herein, the terms "viewer", "operator", "observer", and "user" are considered equivalents and refer to the person or machine who wears and/or views images using a device having an imaging light guide.

Where used herein, the term "set" refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

Where used herein, the terms "coupled," "coupler," or "coupling" in the context of optics refer to a connection by which light travels from one optical medium or device to another optical medium or device.

Where used herein, the term "beam expansion" is intended to mean replication of a beam via multiple encounters with an optical element to provide exit pupil expansion in one or more directions. Similarly, where used herein, the terms "expanded image-bearing light beams" and "expanded set of angularly related beams" refer to a light beam replicated via multiple encounters with an optical element to provide exit pupil expansion in one or more directions.

An optical system, such as a HMD, can produce a virtual image display. In contrast to methods for forming a real image, a virtual image is not formed on a display surface. That is, if a display surface were positioned at the perceived location of a virtual image, no image would be formed on that surface. Virtual image display has a number of inherent advantages for augmented reality presentation. For example, the apparent size of a virtual image is not limited by the size or location of a display surface. Additionally, the source object for a virtual image may be small; for example, a magnifying glass provides a virtual image of an object. In comparison with systems that project a real image, a more realistic viewing experience can be provided by forming a virtual image that appears to be some distance away. Providing a virtual image also obviates the need to compensate for screen artifacts, as may be necessary when projecting a real image.

An image light guide may utilize image-bearing light from a light source such as a projector to display a virtual image. For example, collimated, relatively angularly encoded, light beams from a projector are coupled into a planar waveguide by an input coupling such as an in-coupling diffractive optic, which can be mounted or formed on a surface of the planar waveguide or buried within the waveguide. Such diffractive optics can be formed as diffraction gratings, holographic optical elements (HOEs) or in other known ways. For example, the diffraction grating can be formed by surface relief. After propagating along the waveguide, the diffracted light can be directed back out of the waveguide by a similar output coupling such as an out-coupling diffractive optic, which can be arranged to provide pupil expansion along one dimension of the virtual image. In addition, a turning grating can be positioned on/in the waveguide to provide pupil expansion in an orthogonal dimension of the virtual image. The image-bearing light output from the waveguide provides an expanded eyebox for the viewer.

As illustrated in FIG. 1, an image light guide 10 may comprise a planar waveguide 22 having plane-parallel surfaces 12, 14. The waveguide 22 comprises a transparent substrate S, which, for example, can be made of optical glass or plastic, having plane parallel first and second surfaces 12, 14. In this example, an in-coupling diffractive optic IDO and an out-coupling diffractive optic ODO are arranged on the second surface 14, and the in-coupling diffractive optic IDO is a reflective type diffraction grating through which image-bearing light WI is coupled into the planar waveguide 22. However, the in-coupling diffractive optic IDO could alternately be a volume hologram or other holographic diffraction element, or other type of optical component that provides diffraction for the incoming, image-bearing light WI. The in-coupling diffractive optic IDO can be located on the first surface 12 or the second surface 14 of the planar waveguide 22 and can be of a transmissive or reflective type depending upon the direction from which the image-bearing light WI approaches the planar waveguide 22.

When used as a part of a virtual display system, the in-coupling diffractive optic IDO couples the image-bearing light WI from a real image source 18 into the substrate S of the planar waveguide 22. Any real image or image dimension is first converted into an array of overlapping angularly related beams encoding the different positions within an image for presentation to the in-coupling diffractive optic IDO. The image-bearing light WI is diffracted (generally through a first diffraction order) and thereby redirected the by in-coupling diffractive optic IDO into the planar waveguide 22 as image-bearing light WG for further propagation along the planar waveguide 22 by Total Internal Reflection ("TIR"). Although diffracted into a generally more condensed range of angularly related beams in keeping with the boundaries set by TIR, the image-bearing light WG preserves the image information in an encoded form. The out-coupling diffractive optic ODO receives the encoded image-bearing light WG and diffracts (also generally through a first diffraction order) the image-bearing light WG out of the planar waveguide 22 as the image-bearing light WO toward the intended location of a viewer's eye. Generally, the out-coupling diffractive optic ODO is designed symmetrically with respect to the in-coupling diffractive optic IDO to restore the original angular relationships of the image-bearing light WI among outputted angularly related beams of the image-bearing light WO. However, to increase one dimension of overlap among the angularly related beams in a so-called eyebox E within which the virtual image can be seen, the out-coupling diffractive optic ODO is arranged to encounter the image-bearing light WG multiple times and to diffract only a portion of the image-bearing light WG on each encounter. The multiple encounters along the length of the out-coupling diffractive optic ODO have the effect of enlarging one dimension of each of the angularly related beams of the image-bearing light WO thereby expanding one dimension of the eyebox E within which the beams overlap. The expanded eyebox E decreases sensitivity to the position of a viewer's eye for viewing the virtual image.

Out-coupling diffractive optics with refractive index variations along a single dimension can expand one dimension of the eyebox by replicating the individual angularly related beams in their direction of propagation along the waveguide between encounters with the out-coupling diffractive optic. In addition, out-coupling diffractive optics with refractive index variations along a second dimension can expand a second dimension of the eyebox and provide two-dimensional expansion of the eyebox. The refractive index variations along a first dimension of the out-coupling diffractive optic can be arranged to diffract a portion of each beam's energy out of the waveguide upon each encounter therewith through a desired first order of diffraction, while another portion of the beam's energy is preserved for further propagation in its original direction through a zero order of diffraction. The refractive index variations along a second dimension of the out-coupling diffractive optic can be arranged to diffract a portion of each beam's energy upon each encounter therewith through a desired first order of diffraction in a direction angled relative to the beam's original direction of propagation, while another portion of the beam's energy is preserved for further propagation in its original direction through a zero order of diffraction.

The out-coupling diffractive optic ODO is shown as a transmissive-type diffraction grating arranged on the second surface 14 of the planar waveguide 22. However, like the in-coupling diffractive optic IDO, the out-coupling diffractive optic ODO can be located on the first surface 12 or the second surface 14 of the planar waveguide 22 and be of a transmissive or reflective type in a combination that depends upon the direction through which the image-bearing light WG is intended to exit the planar waveguide 22.

Figure 2:
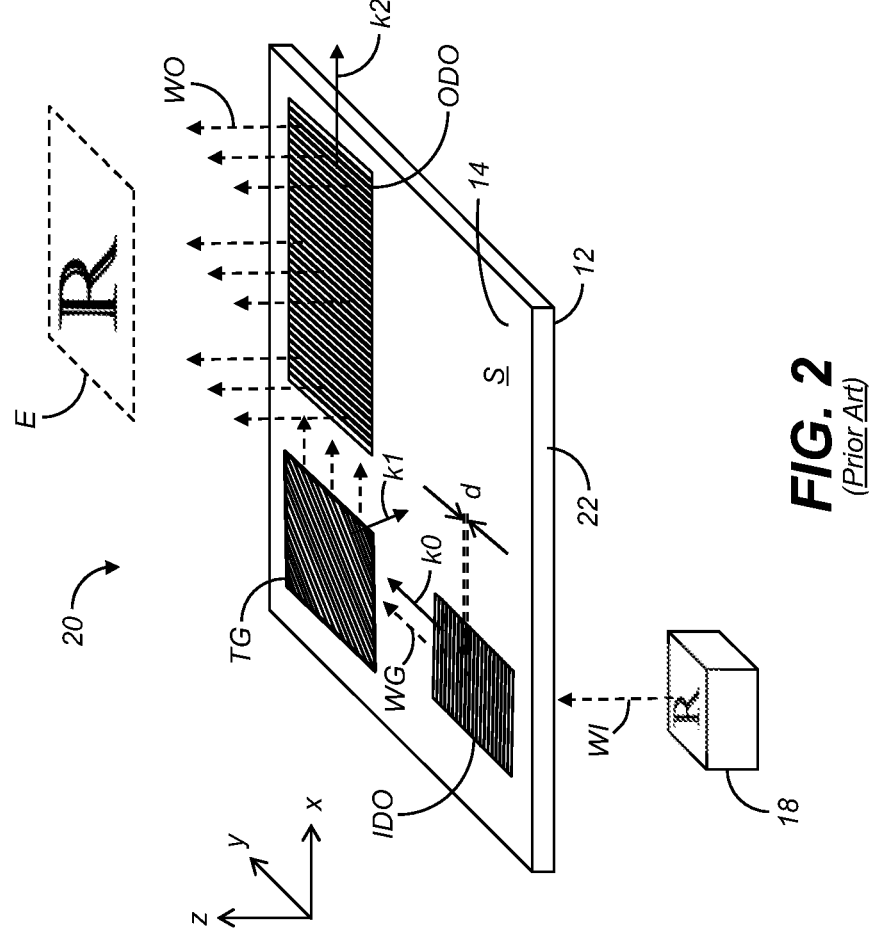
FIG. 2 shows a perspective view of an image light guide with a turning grating showing the expansion of an image-bearing beam perpendicular to the direction of propagation for expanding a second dimension of an eyebox.

As illustrated in FIG. 2, an image light guide 20 may be arranged for expanding an eyebox E in two dimensions, i.e., along both x- and y-axes of the intended image. To achieve a second dimension of beam expansion, the in-coupling diffractive optic IDO, having a grating vector k0, is oriented to diffract a portion of the image-bearing light WI toward an intermediate optic TO, having a grating vector k1, which is oriented to diffract a portion of the image-bearing light WG in a reflective mode toward the out-coupling diffractive optic ODO. The intermediate optic TO may be referred to herein as a turning grating or turning optic. In an embodiment, the intermediate optic TO is a surface relief grating. In another embodiment, the intermediate optic TO is a holographic optical element. Only a portion of the image-bearing light WG is diffracted by each of multiple encounters with intermediate optic TO thereby laterally replicating each of the angularly related beams of the image-bearing light WG approaching the out-coupling diffractive optic ODO. The intermediate optic TO redirects the image-bearing light WG toward the out-coupling diffractive optic ODO for longitudinally replicating the angularly related beams of the image-bearing light WG in a second dimension before exiting the planar waveguide 22 as the image-bearing light WO. Grating vectors, such as the depicted grating vectors k0, k1, k2, extend in a direction that is normal to the diffractive features (e.g., grooves, lines, or rulings) of the diffractive optics and have a magnitude inverse to the period or pitch d (i.e., the on-center distance between grooves) of the diffractive optics IDO, TG, ODO. The in-coupling diffractive optic IDO, the intermediate optic TO, and the out-coupling diffractive optic ODO may each have a different period or pitch d.

With continued reference to FIG. 2, the in-coupling diffractive optic IDO receives the incoming image-bearing light WI containing a set of angularly related beams corresponding to individual pixels or equivalent locations within an image generated by an image source 18. The image source 18, operable to generate a full range of angularly encoded beams for producing a virtual image, may be, but is not limited to, a real display together with focusing optics, a beam scanner for more directly setting the angles of the beams, or a combination such as a one-dimensional real display used with a scanner. In some examples, image source 18 comprises one or more light-emitting diodes (LEDs), organic LEDs (OLEDs), or ultra LEDs (uLEDs). In other examples, image source 18 is a color field sequential projector system operable to pulse image-bearing light of multiple wavebands, for example light from within red, green, and blue wavelength ranges, onto a digital light modulator/micro-mirror array (a "DLP") or a liquid crystal on silicon ("LCOS") display. In further examples, image source 18 includes one or more pico-projectors, where each pico-projector is configured to produce a single primary color band (e.g., red, green, or blue). In another example, image source 18 includes a single pico-projector arranged to produce all three primary color bands (e.g., red, green, and blue). In one example, the three primary color bands are a green band having a wavelength in the range between 495 nm and 570 nm, a red band having a wavelength in the range between 620 nm and 750 nm, and a blue band having a wavelength in the range between 450 nm and 495 nm.

The image light guide 20 outputs an expanded set of angularly related beams in two dimensions of the image by providing multiple encounters of the image-bearing light WG with both the intermediate optic TO and the out-coupling diffractive optic ODO in different orientations. In the original orientation of the planar waveguide 22, the intermediate grating TG provides beam expansion in the y-axis direction, and the out-coupling diffractive optic ODO provides a similar beam expansion in the x-axis direction. The reflectivity characteristics and respective periods d of the diffractive optics IDO, ODO, TG, together with the orientations of their respective grating vectors, provide for beam expansion in two dimensions while preserving the intended relationships among the angularly related beams of the image-bearing light WI that are output from the image light guide 20 as the image-bearing light WO.

While the image-bearing light WI input into the image light guide 20 is encoded into a different set of angularly related beams by the in-coupling diffractive optic IDO, the information required to reconstruct the image is preserved by accounting for the systematic effects of the in-coupling diffractive optic IDO. The intermediate optic TO, located in an intermediate position between the in-coupling and out-coupling diffractive optics IDO, ODO, is typically arranged so that it does not induce any significant change on the encoding of the image-bearing light WG. The out-coupling diffractive optic ODO is typically arranged in a symmetric fashion with respect to the in-coupling diffractive optic IDO, e.g., including diffractive features sharing the same period. Similarly, the period of the intermediate optic TO also typically matches the common period of the in-coupling and out-coupling diffractive optics IDO, ODO. As illustrated in FIG. 2, the grating vector k1 of the intermediate optic TO may be oriented at 45 degrees with respect to the other grating vectors k0, k2 (all as undirected line segments). However, in an embodiment, the grating vector k1 of the intermediate optic TO is oriented at 60 degrees to the grating vectors k0, k2 of the in-coupling and out-coupling diffractive optics IDO, ODO in such a way that the image-bearing light WG is turned 120 degrees. By orienting the grating vector k1 of the intermediate optic TO at 60 degrees with respect to the grating vectors k0, k2 of the in-coupling and out-coupling diffractive optics IDO, ODO, the grating vectors k0, k2 are also oriented at 60 degrees with respect to each other (again considered as undirected line segments). The three grating vectors k0, k1, k2 (as directed line segments) form an equilateral triangle, and sum to a zero-vector magnitude, which avoids asymmetric effects that could introduce unwanted aberrations including chromatic dispersion.

The image-bearing light WI that is diffracted into the planar waveguide 22 is effectively encoded by the in-coupling diffractive optic IDO, whether the in-coupling diffractive optic IDO uses gratings, holograms, prisms, mirrors, or some other mechanism. Any reflection, refraction, and/or diffraction of light that takes place at the in-coupling diffractive optic IDO must be correspondingly decoded by the out-coupling diffractive optic ODO to re-form the virtual image that is presented to the viewer. The intermediate optic TO, placed at an intermediate position between the in-coupling and out-coupling diffractive optics IDO, ODO, is typically designed and oriented so that it does not induce any change on the encoded light. The out-coupling diffractive optic ODO decodes the image-bearing light WG into its original or desired form of angularly related beams that have been expanded to fill the eyebox E.

Whether any symmetries are maintained or not among the intermediate optic TO and the in-coupling and out-coupling diffractive optics IDO, ODO or whether any change to the encoding of the angularly related beams of the image-bearing light WI takes place along the planar waveguide 22, the intermediate optic TO and the in-coupling and out-coupling diffractive optics IDO, ODO are related so that the image-bearing light WO that is output from the planar waveguide 22 preserves or otherwise maintains the original or desired form of the image-bearing light WI for producing the intended virtual image.

The letter "R" represents the orientation of the virtual image that is visible to the viewer whose eye is in the eyebox E. As shown, the orientation of the letter "R" in the represented virtual image matches the orientation of the letter "R" as encoded by the image-bearing light WI. A change in the rotation about the z-axis or angular orientation of incoming image-bearing light WI with respect to the x-y plane causes a corresponding symmetric change in rotation or angular orientation of outgoing light from out-coupling diffractive optic ODO. From the aspect of image orientation, the intermediate optic TO simply acts as a type of optical relay, providing expansion of the angularly encoded beams of the image-bearing light WG along one axis (e.g., along the y-axis) of the image. The out-coupling diffractive optic ODO further expands the angularly encoded beams of the image-bearing light WG along another axis (e.g., along the x-axis) of the image while maintaining the original orientation of the virtual image encoded by the image-bearing light WI. As illustrated in FIG. 2, the intermediate optic TO may be a slanted or square grating arranged on the front or back surfaces of the planar waveguide 22. Alternately, the intermediate optic TO may be a blazed grating.

The present disclosure provides for an image light guide having improved diffraction efficiency and image-bearing light output intensity across the output aperture. More specifically, the present disclosure provides for, inter alia, a waveguide having a compound in-coupling diffractive optic and a compound out-coupling diffractive optic operable to expand image-bearing light beams in two-dimensions and output the expanded image-bearing light beams toward an eyebox.

Figure 3A:
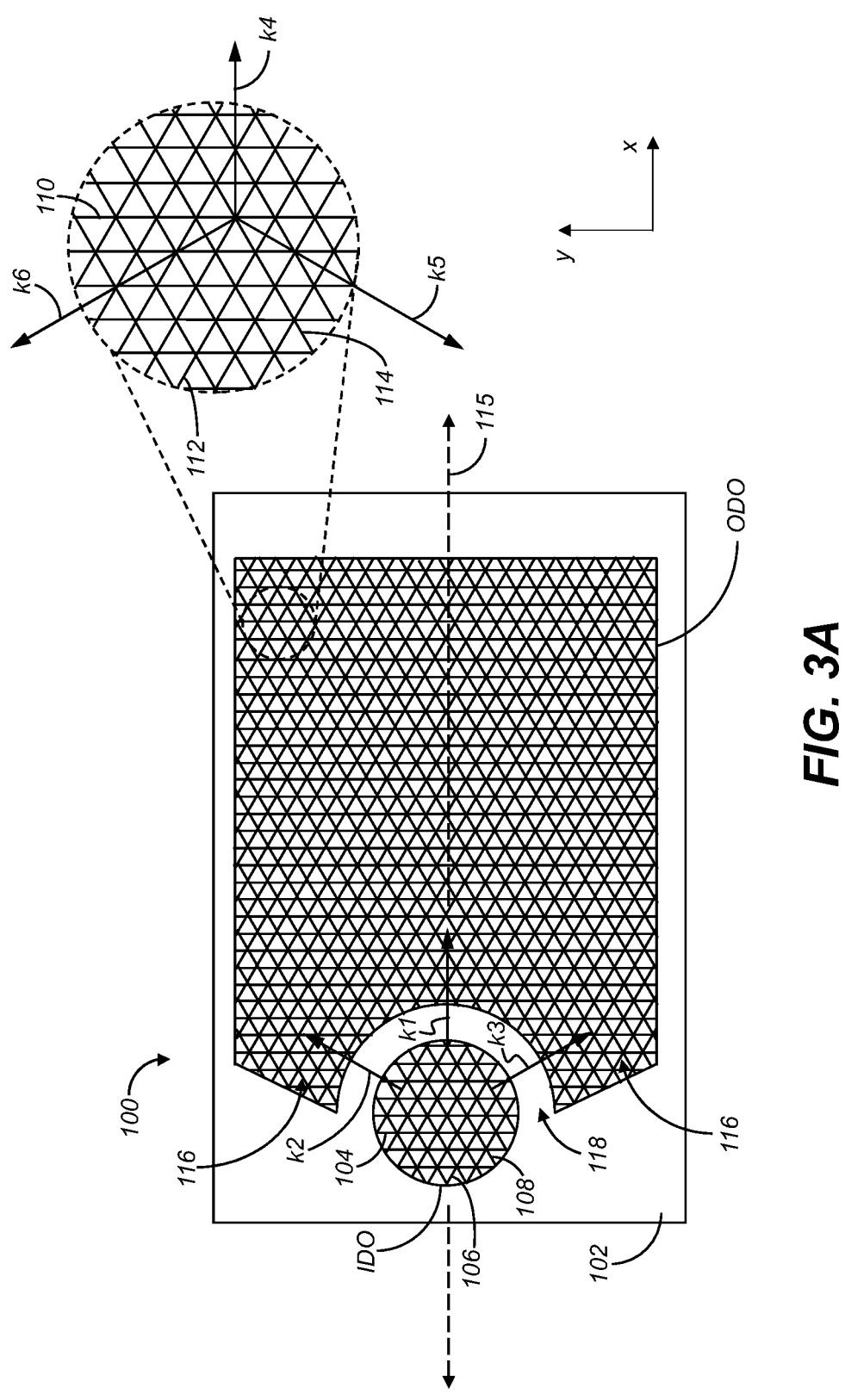
FIG. 3A shows a schematic plan view of an image light guide having an in-coupling diffractive optic with three patterns of periodic diffractive structures according to an exemplary embodiment of the presently disclosed subject matter.
Figure 9:
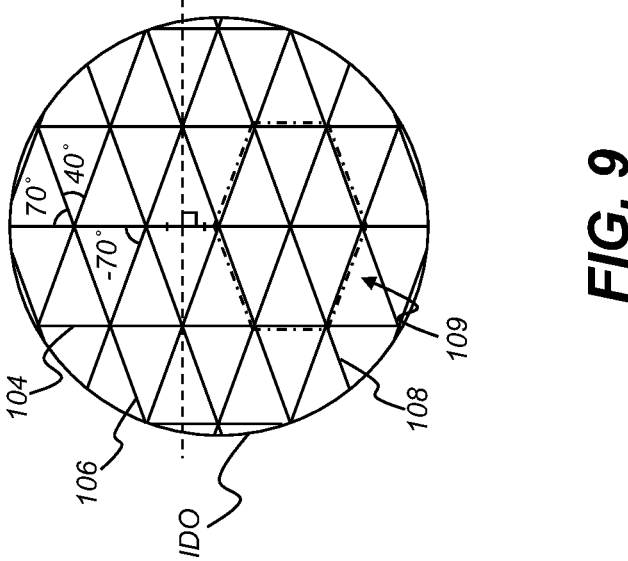
FIG. 9 shows periodic grating structures of the in-coupling diffractive optic according to an exemplary embodiment of the presently disclosed subject matter.

As illustrated in FIG. 3A, in an embodiment, an image light guide 100 may have an in-coupling diffractive optic IDO and an out-coupling diffractive optic ODO formed on/in a first surface 102 of the image light guide 100. Alternately, one or both of the in-coupling and out-coupling diffractive optics IDO, ODO can be formed on/in the second surface of the image light guide 100 located opposite the first surface 102. In an embodiment, the in-coupling diffractive optic IDO comprises three pluralities of periodic grating structures 104, 106, 108. For example, as shown in FIG. 9, the in-coupling diffractive optic IDO may comprise a first set of periodic linear grating structures 104 parallel with the y-axis, a second set of periodic linear grating structures 106 rotated/offset greater than sixty degrees (e.g., 70°) relative to the first set of periodic linear grating structures 104, and a third set of periodic linear grating structures 108 rotated/offset greater than negative sixty degrees (e.g., −70°) relative to the first set of periodic linear grating structures 104. The first set of periodic grating structures 104 of the in-coupling diffractive optic IDO have a grating vector k1 extending normal to the periodic grating structures 104. The second and third sets of grating structures 106, 108 of the in-coupling diffractive optic IDO have second and third grating vectors k2, k3 extending normal to the periodic grating structures 106, 108, respectively. In an embodiment, the first set of periodic grating structures 104 has a different periodicity than the second and third sets of periodic grating structures 106, 108.

It should be appreciated that, in operation, at least a portion of image-bearing light beams incident upon the first, second, and third sets of periodic grating structures 104, 106, 108 of the in-coupling diffractive optic IDO undergo diffraction and are directed into the image light guide 100 as image-bearing light WG for further propagation within the image light guide 100 by TIR and/or by diffraction reflection. To illustrate one or more properties of the presently disclosed embodiments, the image light guide 100 is described and shown herein in terms of the optical paths of one or more portions of a beam of image-bearing light WI that is arranged normal to the plane of the in-coupling diffractive optic IDO when incident thereon, unless otherwise stated. However, persons skilled in the art will recognize that these descriptions are not limiting, and that the image-bearing light WI incident upon the in-coupling diffractive optic IDO may be arranged at any angle and any wavelength for which the system is optimized. It should be appreciated that by optical path, it is meant to include any optical path within the optimized system that the image-bearing light may take in the substrate and further may include a range of wavelengths and a range of incident angles. For example, in an embodiment, the image-bearing light WI incident upon the in-coupling diffractive optic IDO is arranged at any angle and any wavelength within the incident angular range and wavelength ranges for which the system is optimized. In an embodiment, the incident angular range is between zero (normal incidence) and approximately ten degrees from the surface normal. In another embodiment, the incident angular range is between zero and approximately thirty degrees from the surface normal. In yet another embodiment, the incident angular range is between zero and approximately forty-five degrees from the surface normal. In a further embodiment, the incident angular range is between zero and approximately sixty degrees from the surface normal. In another example, a central ray of a beam of image-bearing light WI is incident upon the in-coupling diffractive optic IDO along the normal to the in-coupling diffractive optic IDO, a portion of the image-bearing light WI is incident upon each of the first, second, and third sets of periodic grating structures 104, 106, 108. In this example, portions of the image-bearing light WI are directed parallel to the directions of the first grating vector k1, the second grating vector k2, and the third grating vector k3 towards the out-coupling diffractive optic ODO. The second set of periodic grating structures 106 and the third set of periodic grating structures 108 direct portions of the image-bearing light toward the outer regions (in the y-axis direction) of the out-coupling diffractive optic ODO. Directing portions of the image-bearing light incident upon the in-coupling diffractive optic IDO toward the outer regions (in the y-axis direction) of the out-coupling diffractive optic ODO reduces the intensity of the image-bearing light out-coupled from the center (in the y-axis direction) of the out-coupling diffractive optic ODO. This configuration reduces or eliminates a hotspot in the eyebox.

The first, second, and third sets of periodic grating structures 104, 106, 108 lack regular hexagonal symmetry. As illustrated in FIG. 9, in an embodiment, the in-coupling diffractive optic IDO is formed of a plurality of hexagonal unit cells 109. The hexagonal unit cells 109 describe an irregular hexagon. For example, where the periodic grating structures 104, 106, 108 describe linear gratings, the periodic grating structures 104, 106, 108 are arranged such that they form isosceles triangles (see FIG. 9). In other words, in one embodiment, the first periodic grating structure 104 is parallel with the x- or y-axis of the image light guide and the second and third periodic grating structures 106, 108 are nonparallel to the first periodic grating structure 104. Moreover, the second and third periodic grating structures 106, 108 can be symmetric to each other but are nonsymmetric to the first periodic grating structure 104. That is, the period grating structures 104, 105, 108 are not arranged to form equilateral triangles. Rather, the second set of periodic diffractive structures 106 is offset by greater than sixty degrees relative to the first set of periodic diffractive structures 104 and the third set of periodic diffractive structures 108 is offset by greater than negative sixty degrees relative to the first set of periodic diffractive structures. The first set of periodic grating structures 104 comprises a first period, and the second and third sets of periodic grating structures 106, 108 comprise a second period. The second period is different from the first period. In an embodiment, the first period comprises a smaller periodicity than the second period, such that the first set of periodic grating structures 104 is operable to more efficiently diffract image-bearing light in the red wavelength range R (see, for example, FIG. 3D). In an embodiment, the first period comprises a larger periodicity than the second period, such that the first set of periodic grating structures 104 is operable to more efficiently diffract image-bearing light in the red wavelength range R. In an embodiment, the second and third sets of periodic grating structures 106, 108 are operable to diffract image-bearing light in the blue wavelength range B (see, for example, FIG. 3D). For example, the features of the first set of periodic grating structures 104 compared to the second and third sets of periodic grating structures 106, 108 may be separated by a pitch greater than 50 nm. In an embodiment, the in-coupling diffractive optic IDO has bilateral symmetry across a longitudinal axis 115 of the image light guide 100. By "more efficiently" diffracting image-bearing light in a wavelength, it is meant that a greater amount of image-bearing light goes into a desired diffractive order. A desired diffractive order may include, but is not limited to, a first diffractive order, a second diffractive order, a reflection diffractive order, or a transmission diffractive order.

In an embodiment, the out-coupling diffractive optic ODO comprises fourth, fifth, and sixth sets of periodic grating structures 110, 112, 114. The fourth, fifth, and sixth sets of periodic grating structures 110, 112, 114 also lack full hexagonal symmetry. The fourth, fifth, and sixth sets of periodic grating structures 110, 112, 114 are parallel with the first, second, and third sets of periodic grating structures 104, 106, 108, respectively. The fourth, fifth, and sixth sets of periodic grating structures 110, 112, 114 form a compound diffractive optic operable to expand and out-couple image-bearing light from the out-coupling diffractive optic ODO. In an embodiment, the fifth set of periodic grating structures 112 is crossed with the sixth set of periodic grating structures 114. As illustrated in FIG. 3A, in an embodiment, the fourth set of periodic grating structures 110 are parallel with the first set of periodic grating structures 104 of the in-coupling diffractive optic IDO, the fifth set of periodic grating structures 112 are parallel with the second set of periodic grating structures 106 of the in-coupling diffractive optic IDO, and the sixth set of periodic grating structures 114 are parallel with the third set of periodic grating structures 108 of the in-coupling diffractive optic IDO. The fourth, fifth, and sixth sets of periodic grating structures 110, 112, 114 may also have the same periodicity as the first, second, and third sets of periodic grating structures 104, 106, 108, respectively. In an embodiment, the out-coupling diffractive optic ODO has bilateral symmetry across the longitudinal axis 115 of the image light guide 100.

The fourth, fifth, and sixth sets of periodic grating structures 110, 112, 114 of the out-coupling diffractive optic ODO form fourth, fifth, and sixth grating vectors k4, k5, k6, respectively. In an embodiment, the grating vector k4 is parallel with the grating vector k1. The grating vector k5 is offset from the in-coupling grating vector k1 and from the x-axis by sixty-degrees (+60°), and the grating vector k6 is offset from the in-coupling grating vector k1 and the x-axis by negative sixty-degrees (−60°).

Figure 3B:
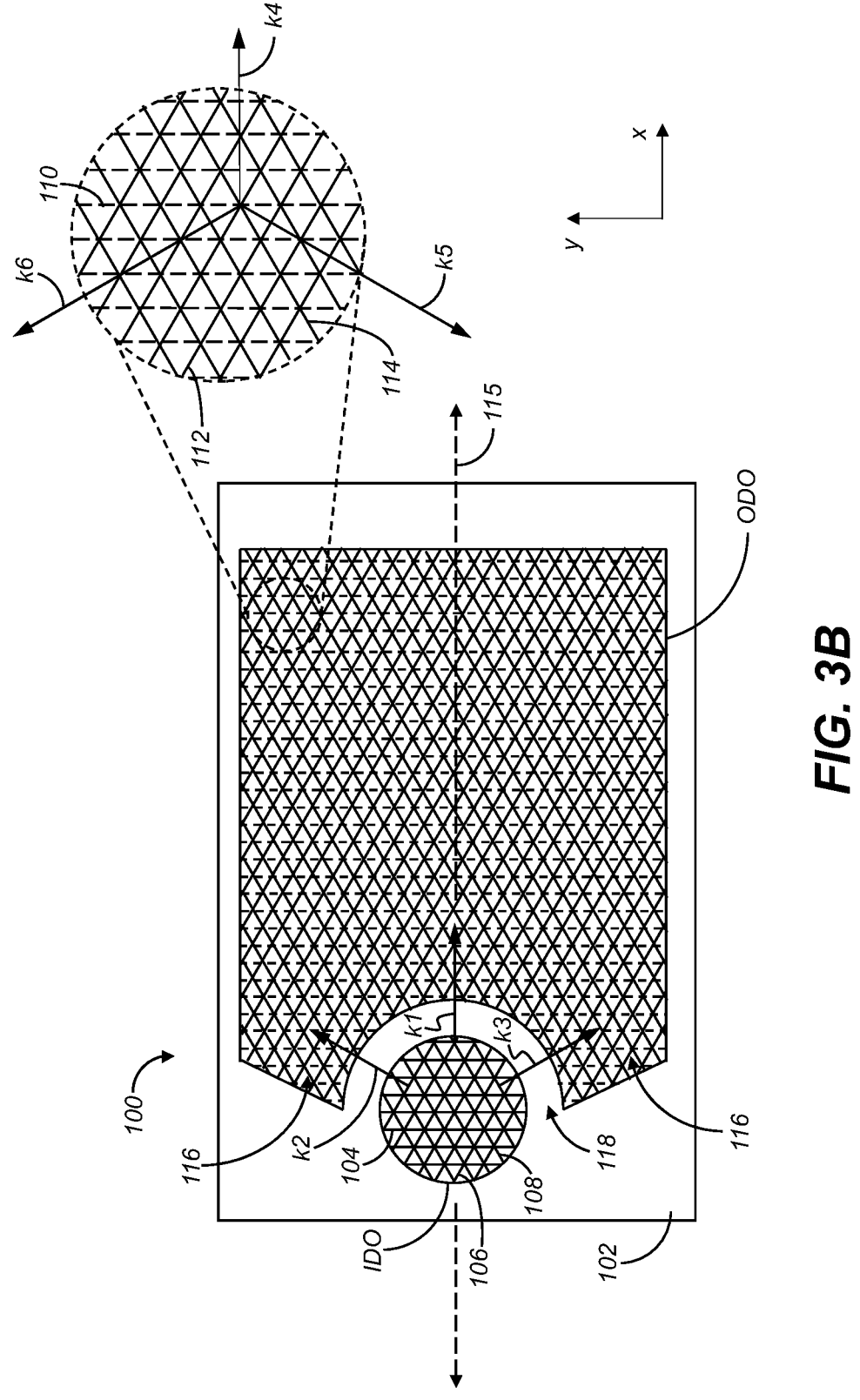
FIG. 3B shows a schematic plan view of an image light guide having an in-coupling diffractive optic with three patterns of periodic diffractive structures according to an exemplary embodiment of the presently disclosed subject matter.
Figure 3C:
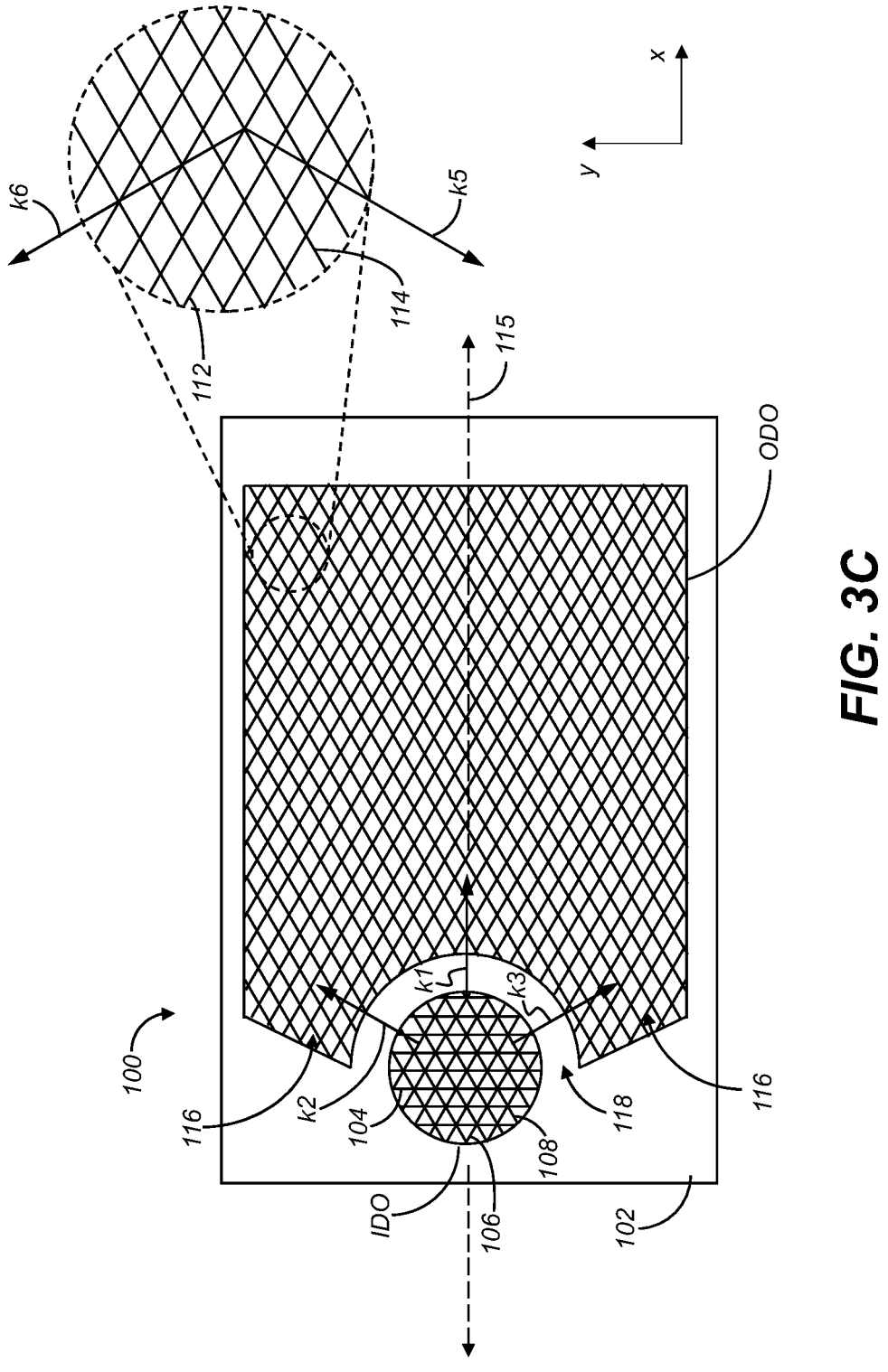
FIG. 3C shows a schematic plan view of an image light guide having an in-coupling diffractive optic with three patterns of periodic diffractive structures according to an exemplary embodiment of the presently disclosed subject matter.
Figure 3D:
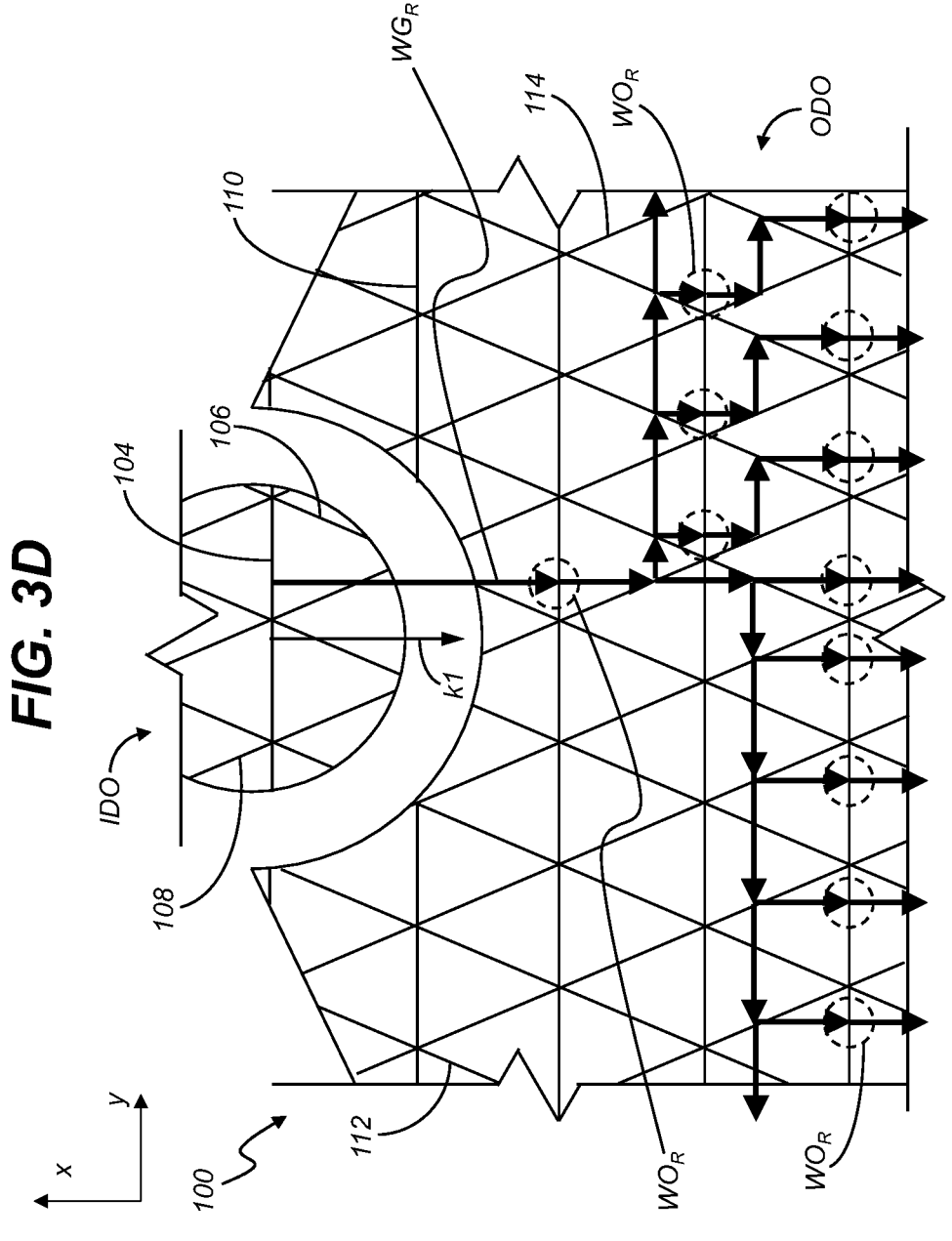
FIG. 3D shows a portion of a schematic of the path of a first wavelength range of image-bearing light within an image light guide according to FIG. 3A.

As illustrated in FIG. 3D, in an embodiment, the first and fourth sets of periodic grating structures 104, 110 have generally the same grating pitch and are configured to more efficiently diffract image-bearing light beams of a first wavelength range R (e.g., red light). In operation, at least a portion of image-bearing light beams of the first wavelength range R incident upon the first, second, and third sets of periodic grating structures 104, 106, 108 of the in-coupling diffractive optic IDO undergo diffraction and are directed into the image light guide 100 as image-bearing light WG R for further propagation within the image light guide 100 by TIR and/or by diffraction reflection. To illustrate one or more properties of the presently disclosed embodiments, the image light guide 100 is described below, inter alia, in terms of the optical paths of one or more portions of a beam of image-bearing light WI that is arranged normal to the plane of the in-coupling diffractive optic IDO when incident thereon, unless otherwise stated. However, persons skilled in the art will recognize that these descriptions are not limiting, and that the image-bearing light WI incident upon the in-coupling diffractive optic IDO may be arranged at any angle for which the system is optimized.

Figure 3E:
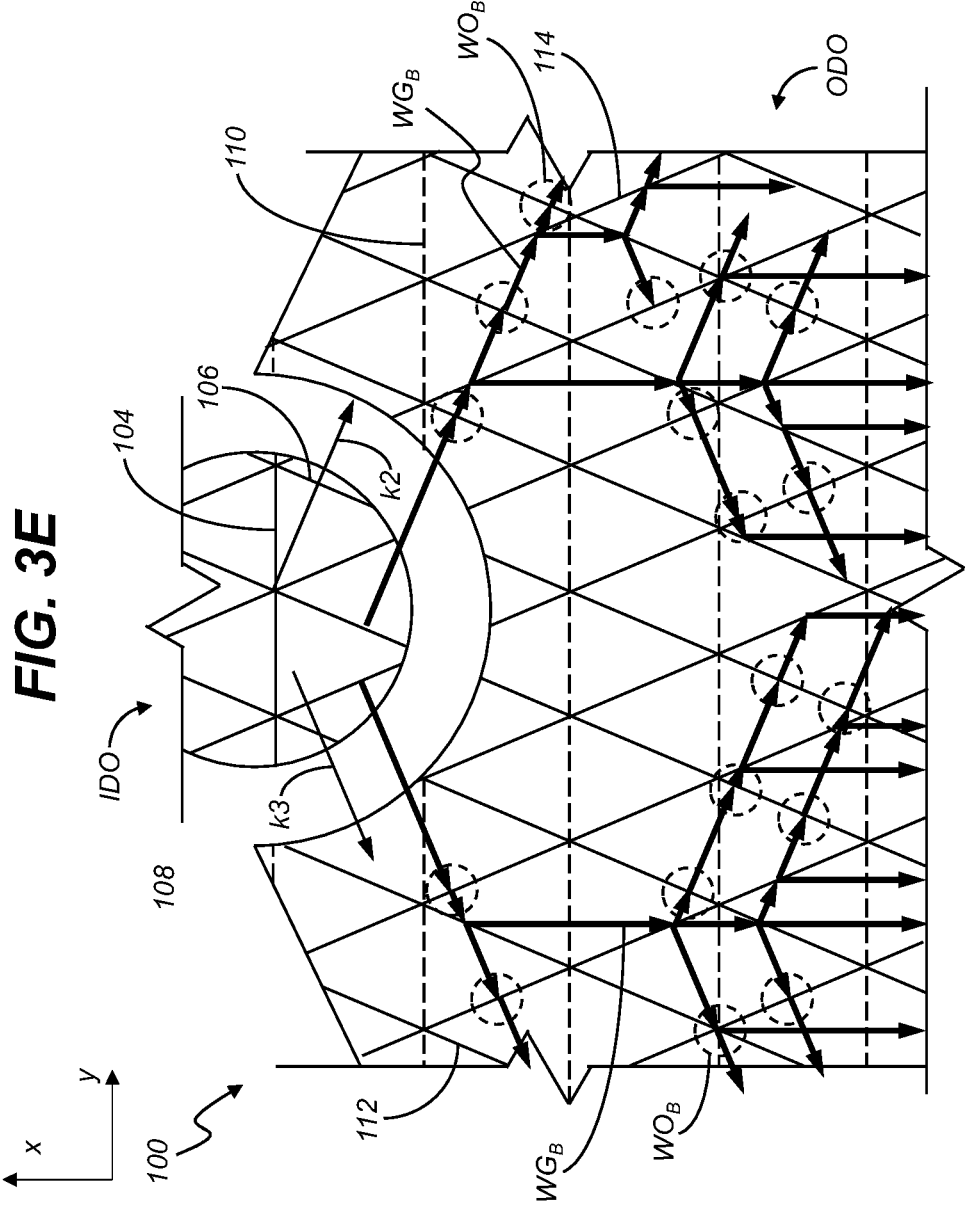
FIG. 3E shows a portion of a schematic of the path of a second wavelength range of image-bearing light within an image light guide according to FIG. 3A.

In FIGS. 3D and 3E, the arrows showing portions of the optical paths for image-bearing light $WI_R$, $WI_B$ are intended to illustrate the principals enabling the configuration of the presently disclosed embodiments to in-couple, propagate, expand, and out-couple more than one wavelength range of image-bearing light, and the arrows do not represent any magnitude thereof.

For example, where a central ray of a beam of image-bearing light WI is incident upon the in-coupling diffractive optic IDO along the normal to the in-coupling diffractive optic IDO, a portion of the image-bearing light WI is incident upon each of the first, second, and third sets of periodic grating structures 104, 106, 108. In this example, portions of the first wavelength range R of image-bearing light $WI_R$ are directed parallel to the directions of the first grating vector k1 towards the out-coupling diffractive optic ODO. A portion of the first wavelength range R of image-bearing light beams $WG_R$ incident upon the fourth set of periodic grating structures 110 are outcoupled as image-bearing light $WO_R$. Another portion of the first wavelength range R of image-bearing light beams $WG_R$ continues along the original nominal direction of propagation and is incident upon the sixth set of periodic grating structures 114 and is diffracted and a portion of the image-bearing light beam $WG_R$ is directed toward an outer edge of the out-coupling diffractive optic ODO in generally the y-axis direction. A portion of the image-bearing light beam $WG_R$ propagating in the y-axis direction is incident upon the fifth set of periodic grating structures 112 and diffracted and a portion of the image-bearing light beam $WG_R$ is directed in generally the x-axis direction. When a portion of the image-bearing light beam $WG_R$ is again incident upon the fourth set of periodic grating structures 110, another portion of the image-bearing light beam $WG_R$ is outcoupled as image-bearing light $WO_R$. Persons skilled in the art will recognize that FIG. 3D does not show every instance, and/or order, of diffraction of image-bearing light beams $WG_R$ to facilitate ease of understanding the presently disclosed subject matter.

FIG. 3E is a schematic showing an example of blue light B diffraction in the image light guide 100. The second, third, fifth and sixth sets of periodic grating structures 106, 108, 112, 114 have generally the same grating pitch and are configured to more efficiently diffract image-bearing light beams of a second wavelength range B (e.g., blue light). Where a central ray of a beam of image-bearing light WI is incident upon the in-coupling diffractive optic IDO along the normal to the in-coupling diffractive optic IDO, a portion of the image-bearing light WI is incident upon each of the first, second, and third sets of periodic grating structures 104, 106, 108. In this example, at least a portion of image-bearing light beams $WI_B$ of the second wavelength range B that are incident upon the first, second, and third sets of periodic grating structures 104, 106, 108 of the in-coupling diffractive optic IDO undergo diffraction and are directed into the image light guide 100 as image-bearing light $WG_B$ for further propagation within the image light guide 100 by TIR and/or by diffraction reflection. Portions of the image-bearing light beam $WG_B$ are directed parallel to the direction of the second grating vector k2 and the third grating vector k3 towards the out-coupling diffractive optic ODO.

For example, a portion of the image-bearing light beam $WG_B$ directed parallel to the second grating vector k2 and incident upon the fifth set of periodic grating structures 112 are outcoupled as image-bearing light $WO_B$. Another portion of the image-bearing light beam $WG_B$ incident upon the sixth set of periodic grating structures 114 is diffracted and directed in generally the x-axis direction. When this portion of the image-bearing light beam $WG_B$ is then incident upon the fifth set of periodic grating structures 112, the image-bearing light beam $WG_B$ is again diffracted, and a portion of the image-bearing light $WG_B$ is directed generally parallel to the sixth grating vector k6. When this portion of image-bearing light beam $WG_B$ is then incident upon the sixth set of periodic grating structures 114, another portion of the image-bearing light $WG_B$ is outcoupled as image-bearing light $WO_B$.

Similarly, a portion of the image-bearing light beam $WG_B$ directed parallel to the third grating vector k3 and incident upon the sixth set of periodic grating structures 114 are outcoupled as image-bearing light $WO_B$. A portion of the image-bearing light beam $WG_B$ incident upon the fifth set of periodic grating structures 112 is diffracted and directed in generally the x-axis direction. When this portion of the image-bearing light beam $WG_B$ is then incident upon the sixth set of periodic grating structures 114, the image-bearing light beam $WG_B$ is again diffracted, and a portion of the image-bearing light $WG_B$ is directed generally parallel to the fifth grating vector k5. When this portion of image-bearing light beam $WG_B$ is then incident upon the fifth set of periodic grating structures 112, another portion of the image-bearing light $WG_B$ is outcoupled as image-bearing light $WO_B$. Persons skilled in the art will recognize that FIG. 3E does not show every instance, and/or order, of diffraction of image-bearing light beams $WG_B$ to facilitate ease of understanding the presently disclosed subject matter.

In conventional beam expanders, light is outcoupled after odd numbers of incidents upon intermediate (e.g., turning) diffractive features. In the image light guide 100, the image-bearing light WG is outcoupled after even numbers of incidents upon intermediate diffractive features. In the present configuration, the image-bearing light WG undergoes an additional turn (as compared to odd output systems) such that the image-bearing light WG aligns (e.g., generally normal) with a set of periodic grating structures. For example, as shown in FIG. 3D, a portion of image-bearing light beams $WG_R$ are incident upon a diffractive feature of the first set of periodic grating structures 104 in the in-coupling diffractive optic IDO, a portion of the image-bearing light beams $WG_R$ propagating in the nominal original direction of propagation parallel with the grating vector k1 is diffracted when incident upon a diffractive feature of the fourth set of periodic grating structures 110 and a portion of the image-bearing light beams $WG_R$ is outcoupled. A portion of the image-bearing light beams $WG_R$ undergoes a first (odd) instance of intermediate (e.g., turning) diffraction when incident upon a diffractive feature of the sixth set of periodic grating structures 114 and a portion of the image-bearing light beams $WG_R$ is turned in the y-axis direction, this portion of the image-bearing light beams $WG_R$ undergoes a second (even) instance of intermediate (e.g., turning) diffraction when incident upon a diffractive feature of the fifth set of periodic grating structures 112 and is turned in the x-axis direction, this portion of the image-bearing light beams $WG_R$ undergoes another instance of diffraction when incident upon a diffractive feature of the fourth set of periodic grating structures 110 and a portion of the image-bearing light beams $WG_R$ is outcoupled as image-bearing light $WO_R$. This configuration increases the diffraction efficiency of the image light guide 100. In this configuration, any portion of image-bearing light beams $WG_R$ output after an odd number of instances of intermediate (e.g., turning) diffraction would be output through diffractive features having a pitch designed for the image-bearing light beams $WG_B$, such that the efficiency of that out-coupled order of diffraction is significantly reduced. As illustrated in FIG. 3E, the optical path of the image-bearing light beams $WG_B$ is similarly configured to outcouple after even numbers of incidents upon intermediate (e.g., turning) diffractive features.

Referring now to FIGS. 3A and 3B, in an embodiment, a portion 116 of the out-coupling diffractive optic ODO wraps about the in-coupling diffractive optic IDO. In other words, the portions 116 of the out-coupling diffractive optic ODO extends at least partially about the in-coupling diffractive optic IDO such that a beam of image-bearing light WG incident upon the in-coupling diffractive optic IDO perpendicular to the plane thereof is diffracted along the second and third grating vectors k2, k3 and is incident upon the portions 116 of the out-coupling diffractive optic ODO. As illustrated in FIGS. 3A and 3B, in an embodiment, the out-coupling diffractive optic ODO and the in-coupling diffractive optic IDO are laterally separated in the x-axis and y-axis directions by a space 118. The space 118 may be arcuate and does not include any periodic diffractive structures.

In an embodiment, the depth of the periodic grating structures 106, 108, 110, 112 in the in-coupling diffractive optic IDO and the out-coupling diffractive optic ODO is the same. In another embodiment, the depth of periodic grating structures 104, 106, 108, 110, 112 are varied to increase the efficiency of selected orders of diffraction. For example, the periodic grating structures 106, 108 may have a greater depth than the periodic grating structures 104, 110, 112.

Referring now to FIG. 3B, in an embodiment, the fourth set of periodic grating structures 110 have a shallower depth than the fifth and sixth sets of periodic grating structures 112, 114 comprising the out-coupling diffractive optic ODO. In diffractive optics comprising diffraction gratings, increasing grating depth results in improved diffraction efficiency. This configuration reduces the prominence of the fourth set of periodic grating structures 110 and decreases the image-bearing light WG outcoupled therefrom to increase light distribution to the outer edges of the out-coupling diffractive optic ODO in the y-axis direction.

Referring now to FIG. 3C, in an embodiment, the fourth set of periodic grating structures 110 are absent from the out-coupling diffractive optic ODO. In diffractive optics comprising a compound grating pattern (e.g., two crossed diffraction gratings), a third grating vector is implicitly defined by the grating pattern. This configuration decreases, but does not eliminate, the image-bearing light WG outcoupled from the implied grating structures. Thereby, increasing light distribution to the outer edges of the out-coupling diffractive optic ODO in the y-axis direction.

Figure 4A:
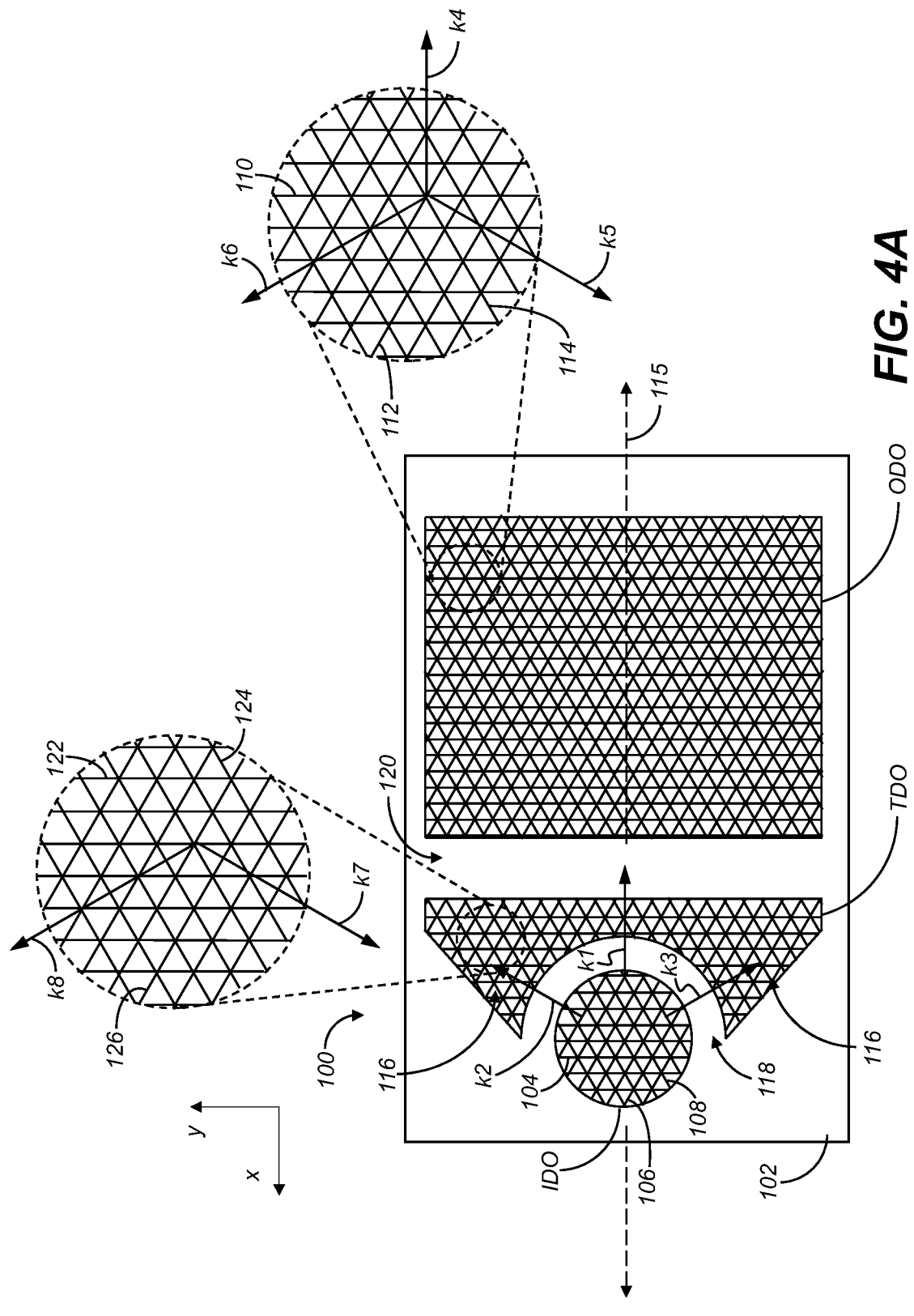
FIG. 4A shows a schematic plan view of an image light guide having an intermediate diffractive optic at least partially located about the in-coupling diffractive optic according to an exemplary embodiment of the presently disclosed subject matter.
Figure 4B:
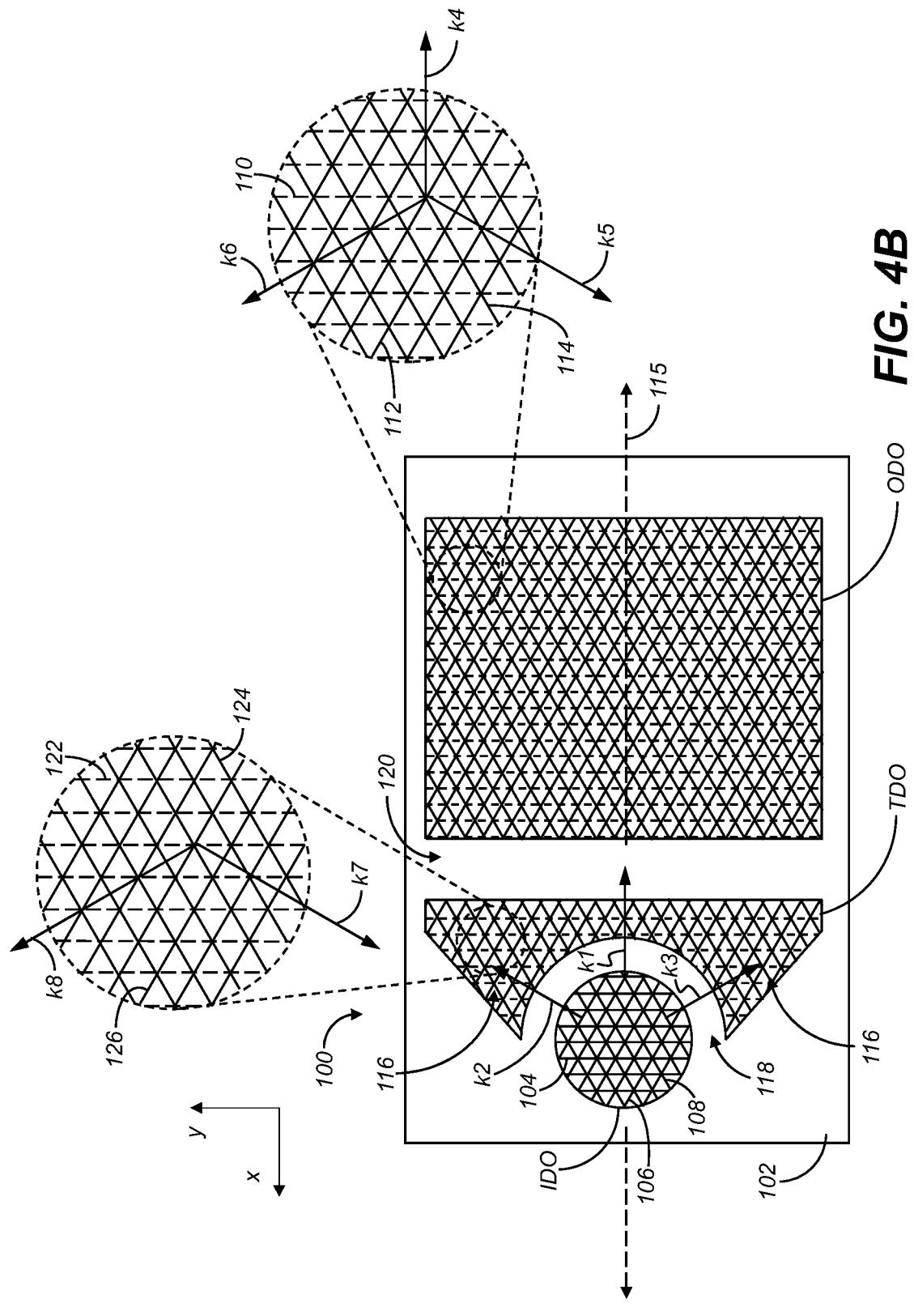
FIG. 4B shows a schematic plan view of an image light guide having an intermediate diffractive optic at least partially located about the in-coupling diffractive optic according to an exemplary embodiment of the presently disclosed subject matter.

As illustrated in FIGS. 4A and 4B, in an embodiment, the image light guide 100 includes an intermediate diffractive optic TDO formed on/in the first surface 102 of the image light guide 100. Alternately, the intermediate diffractive optic TDO may be formed on/in the second surface of the image light guide 100 located opposite the first surface 102. The intermediate diffractive optic TDO is located in the path of the image-bearing light between the in-coupling diffractive optic IDO and the out-coupling diffractive optic ODO. The intermediate diffractive optic TDO and the in-coupling diffractive optic IDO are laterally separated in the x-axis and y-axis directions by the space 118. A portion 116' of the intermediate diffractive optic TDO wraps about the in-coupling diffractive optic IDO. In other words, the portion 116' of the intermediate diffractive optic TDO extends at least partially about the in-coupling diffractive optic IDO such that portions of the image-bearing light WG directed parallel with the second and third grating vectors k2, k3 are incident upon the portions 116' of the intermediate diffractive optic TDO.

With continued reference to FIGS. 4A and 4B, the intermediate diffractive optic TDO and the out-coupling diffractive optic ODO are laterally separated in the x-axis direction by a second space 120. The intermediate diffractive optic TDO comprises seventh, eighth, and ninth sets of periodic grating structures 122, 124, 126. In an embodiment, seventh, eighth, and ninth sets of periodic grating structures 122, 124, 126 have the same orientation, periodicity, and symmetry as the fourth, fifth and sixth sets of periodic grating structures 110, 112, 114, respectively, of the out-coupling diffractive optic ODO. In an embodiment, the seventh, eighth, and ninth grating vectors k7, k8, k9 of the seventh, eighth, and ninth sets of periodic grating structures 122, 124, 126 are equal in magnitude and direction to the grating vectors k4, k5, k6, respectively. The intermediate diffractive optic TDO enables greater freedom in the positioning of the out-coupling diffractive optic ODO.

Referring now to FIG. 4B, in an embodiment, the fourth set of periodic grating structures 110 have a shallower depth than the fifth and sixth sets of periodic grating structures 112, 114 comprising the out-coupling diffractive optic ODO. As described with regard to FIG. 3B, this configuration reduces the prominence of the fourth set of periodic grating structures 110 and decreases the image-bearing light WG outcoupled therefrom to increase light distribution to the outer edges of the out-coupling diffractive optic ODO in the y-axis direction. Similarly, the seventh set of periodic grating structures 122 have a lesser depth than the eighth and ninth sets of periodic grating structures 124, 126 comprising the intermediate diffractive optic TDO.

Figure 4C:
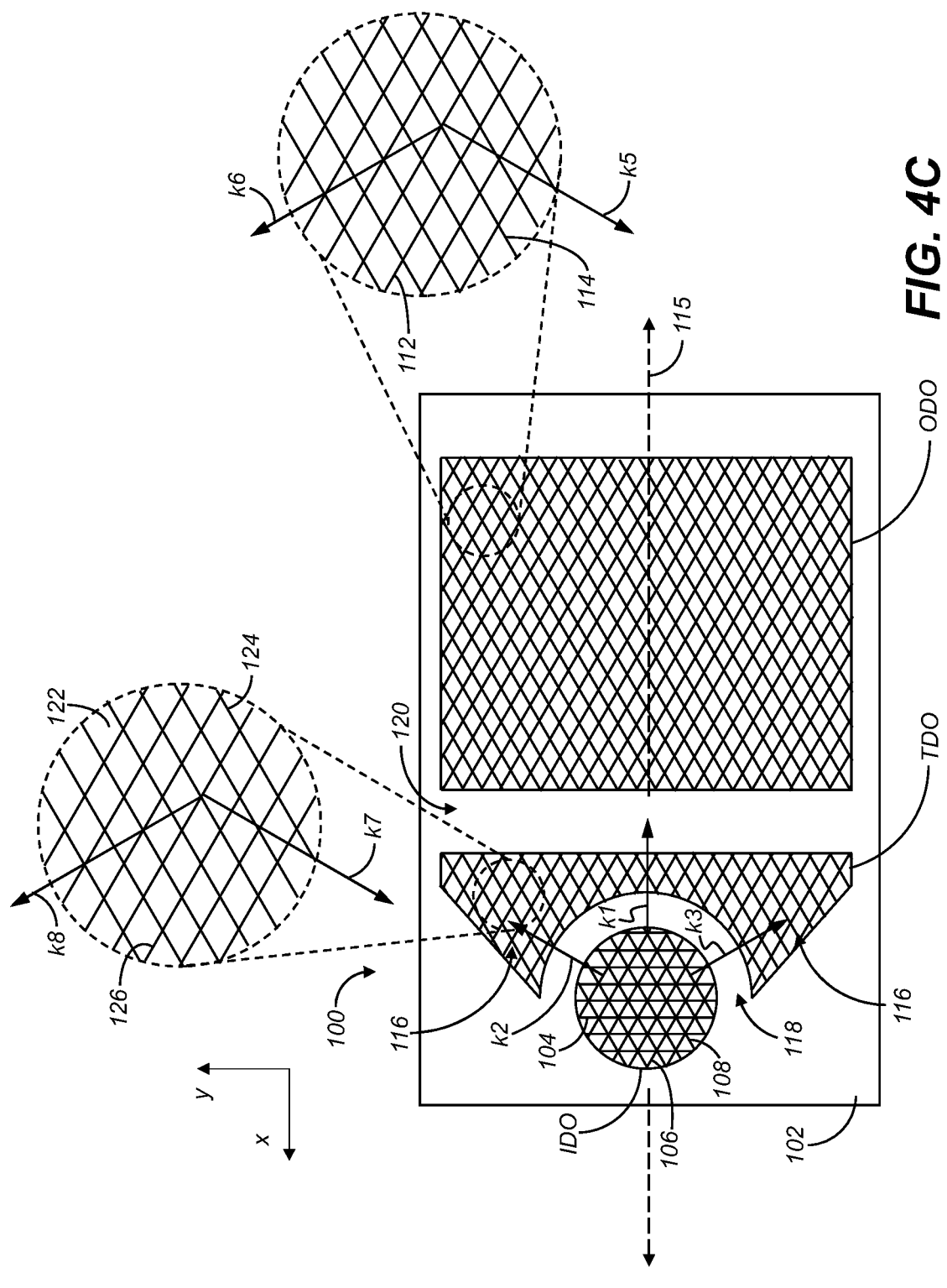
FIG. 4C shows a schematic plan view of an image light guide having an intermediate diffractive optic at least partially located about the in-coupling diffractive optic according to an exemplary embodiment of the presently disclosed subject matter.

Referring now to FIG. 4C, in an embodiment, the fourth set of periodic grating structures 110 are absent from the out-coupling diffractive optic ODO. As described with regard to FIG. 3B, this configuration decreases, but does not eliminate, the image-bearing light WG outcoupled from the implied grating structures. Thereby, increasing light distribution to the outer edges of the out-coupling diffractive optic ODO in the y-axis direction. Similarly, the seventh set of periodic grating structures 122 are absent from the intermediate diffractive optic TDO.

Figure 5A:
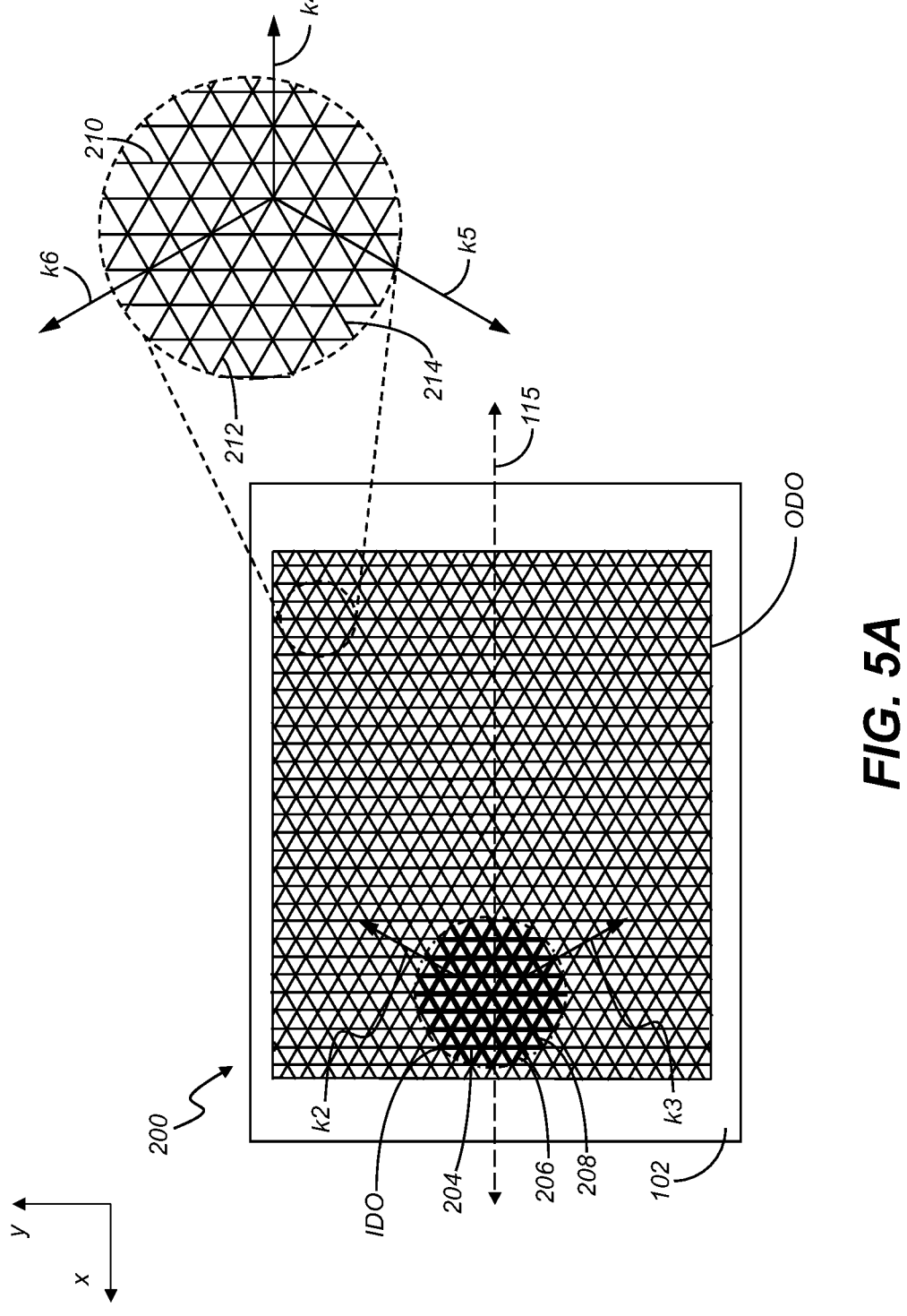
FIG. 5A shows a schematic plan view of an image light guide having in-coupling and out-coupling diffractive optics configured as a single continuous diffractive pattern according to an exemplary embodiment of the presently disclosed subject matter.
Figure 5B:
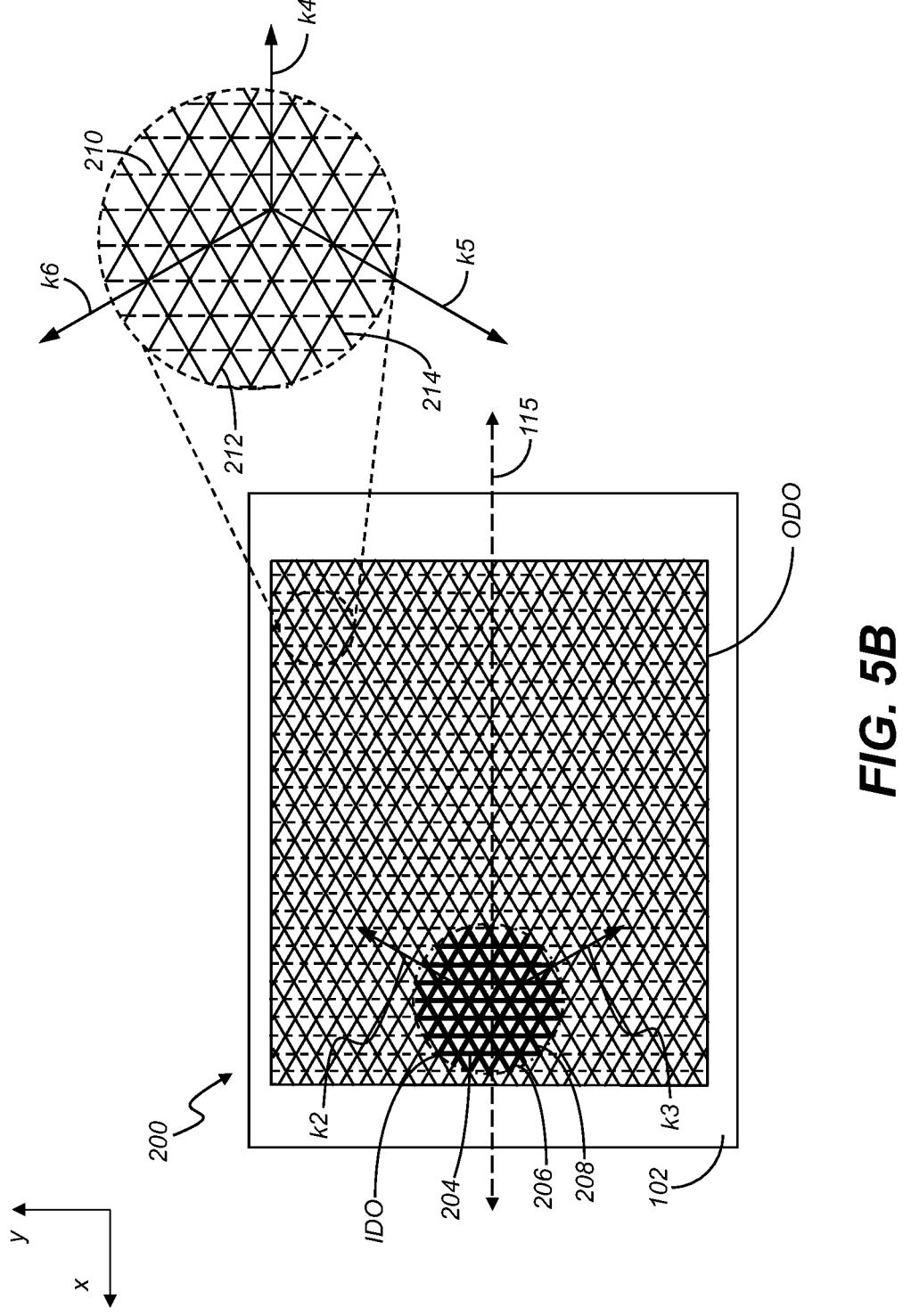
FIG. 5B shows a schematic plan view of an image light guide having in-coupling and out-coupling diffractive optics configured as a single continuous diffractive pattern according to an exemplary embodiment of the presently disclosed subject matter.

As illustrated in FIGS. 5A and 5B, in an embodiment, an image light guide 200 may have an in-coupling diffractive optic IDO and an out-coupling diffractive optic ODO formed on/in a first surface 202 of the image light guide 200. The in-coupling diffractive optic IDO and the out-coupling diffractive optic ODO may be configured as a single continuous diffractive pattern. The in-coupling diffractive optic IDO and out-coupling diffractive optic ODO are formed with the periodicity and orientation as described with regard to the embodiments shown in FIGS. 3A and 3B. In an embodiment, the depth of the periodic grating structures 206, 208 comprising the in-coupling diffractive optic IDO have a greater depth than the periodic grating structures comprising the out-coupling diffractive optic ODO. In diffractive optics comprising diffraction gratings, increased grating depth results in improved diffraction efficiency.

Referring now to FIG. 5B, in an embodiment, the fourth set of periodic grating structures 210 have a shallower depth than the fifth and sixth sets of periodic grating structures 212, 214 comprising the out-coupling diffractive optic ODO. As described with regard to FIG. 3B, this configuration reduces the prominence of the fourth set of periodic grating structures 210 and decreases the image-bearing light WG outcoupled therefrom to increase light distribution to the outer edges of the out-coupling diffractive optic ODO in the y-axis direction.

Figure 5C:
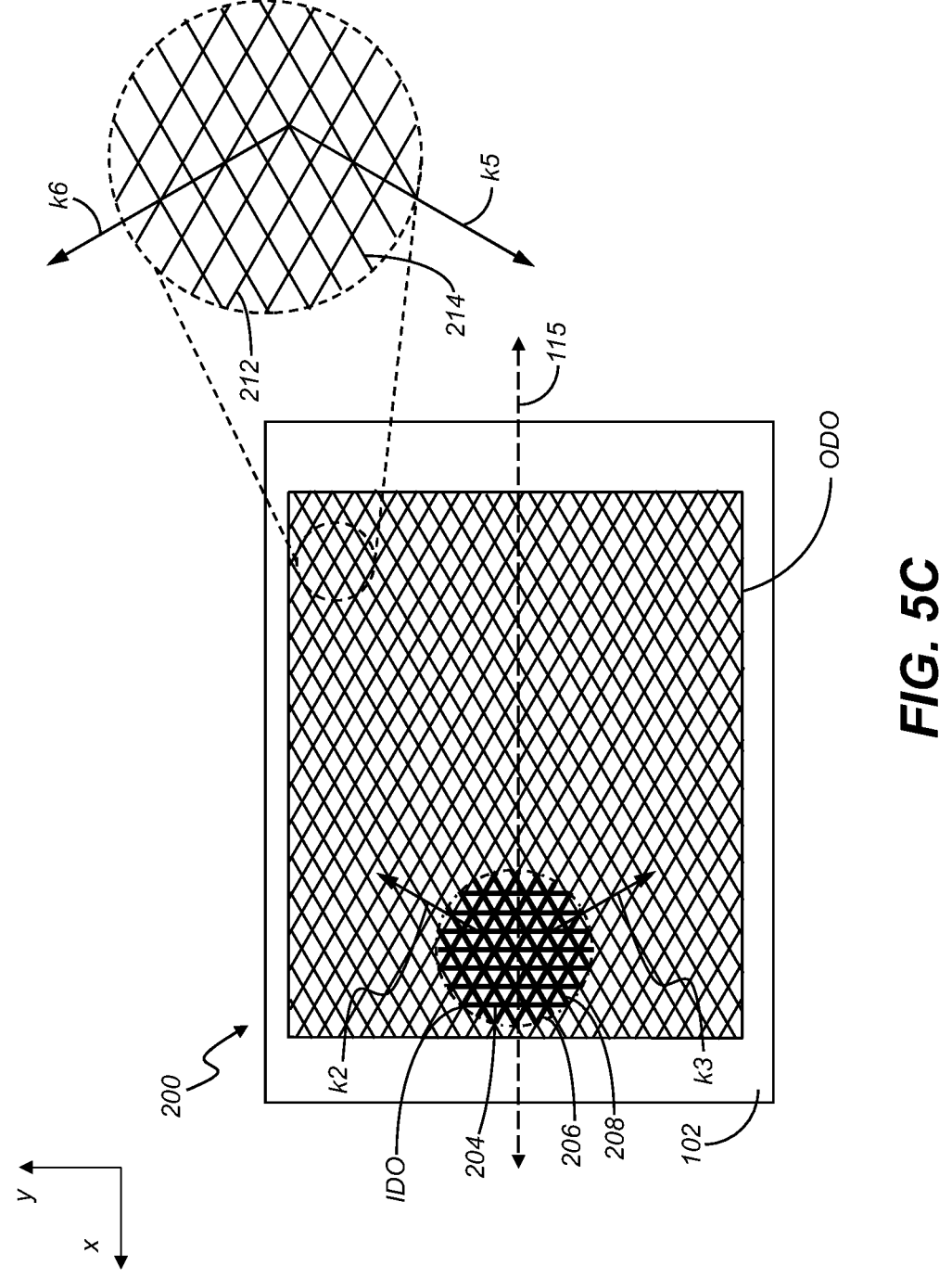
FIG. 5C shows a schematic plan view of an image light guide having in-coupling and out-coupling diffractive optics configured as a single continuous diffractive pattern according to an exemplary embodiment of the presently disclosed subject matter.

Referring now to FIG. 5C, in an embodiment, the fourth set of periodic grating structures 210 are absent from the out-coupling diffractive optic ODO. As described with regard to FIG. 3B, this configuration decreases, but does not eliminate, the image-bearing light WG outcoupled from the implied grating structures. Thereby, increasing light distribution to the outer edges of the out-coupling diffractive optic ODO in the y-axis direction.

Figure 6:
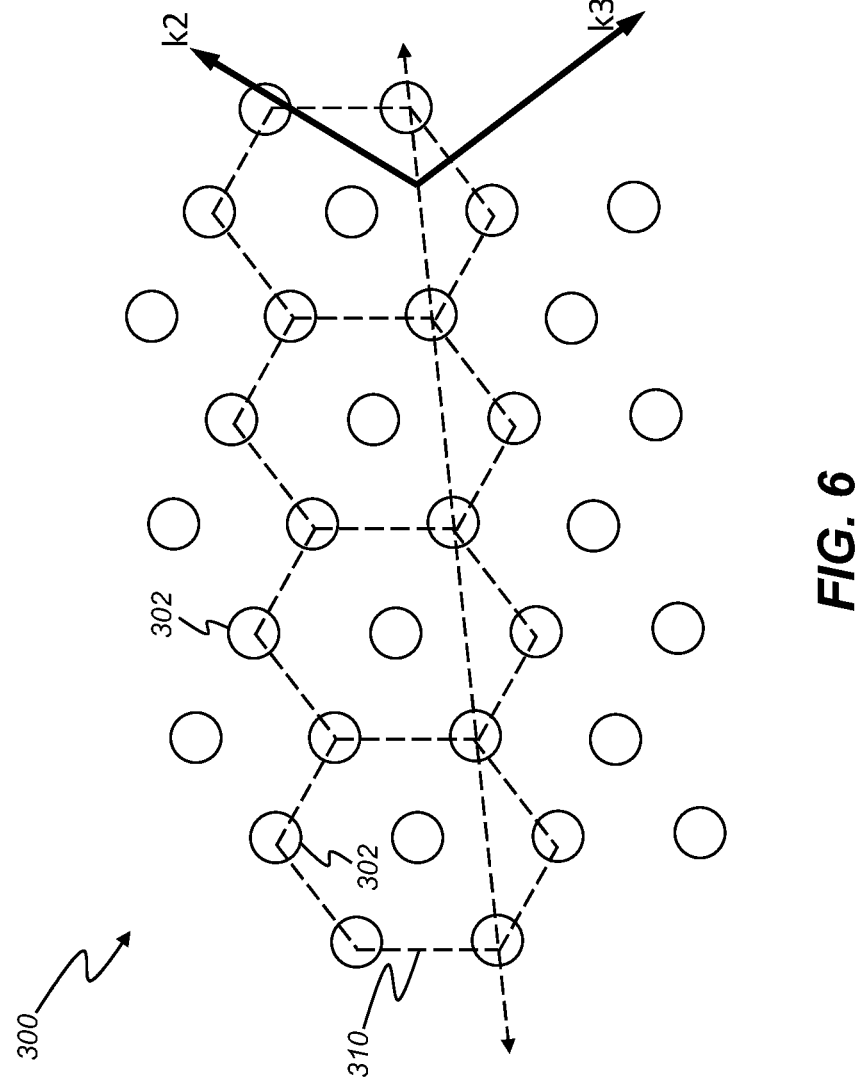
FIG. 6 shows a schematic of a portion of a compound diffraction grating pattern operable to expand and out-couple image-bearing beams according to an exemplary embodiment of the presently disclosed subject matter.

In embodiments of the present disclosure, the periodic structures may be, but are not limited to, straight line diffractive features, circular posts, or elliptical posts. For example, FIG. 6 shows a compound diffractive pattern 300 having diffractive features comprising circular posts 302. The compound diffractive pattern 300 is defined by a plurality of hexagonal unit cells 310 positioned in a two-dimensional lattice. The in-coupling diffractive optic IDO and the out-coupling diffractive optic ODO of the image light guides 100, 200 (see FIGS. 4 and 5) may similarly be configured as a two-dimensional lattice of hexagonal unit cells.

Figure 7:
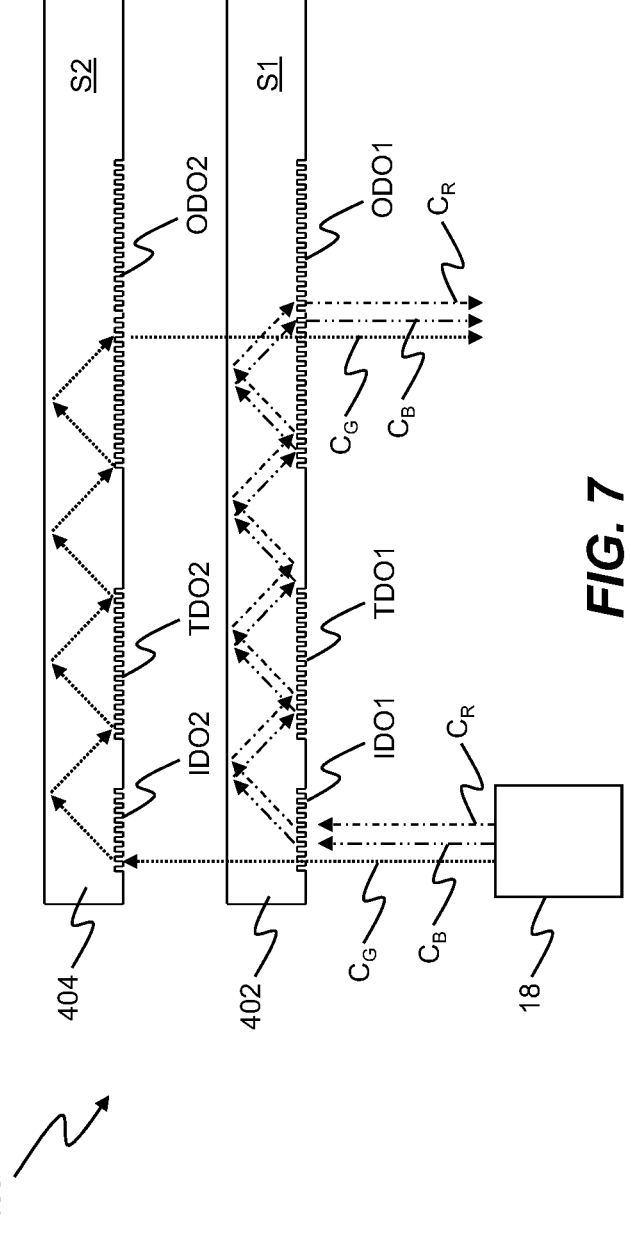
FIG. 7 shows a stacked imaging light guide system according to an exemplary embodiment of the presently disclosed subject matter.

As illustrated in FIG. 7, in an embodiment, a stacked image light guide assembly 400 includes a first image light guide 402 coupled with a second image light guide 404 forming a polychromatic image light guide assembly. The first image light guide 402 may be one of the image light guides 100, 200 described supra. The image light guides 402, 404 are formed on separate substrates S1, S2 that are mechanically coupled. In an embodiment, the image light guides 402, 404 are coupled via an adhesive. In some embodiments, the image light guide 402 is mechanically coupled to image light guide 404 by partial contact in such a way as to not significantly alter the TIR properties of either image light guide 402, 404. Further, in some embodiments, the stacked image light guides 402, 404 include a partial or full air gap or spacing between the substrates S1, S2. In an embodiment, the stacked image light guide assembly 400 provides three separate color optical paths, which are sometimes referred to hereinafter as channels. As illustrated in FIG. 7, the first image light guide 402 has a red path $C_R$ for red light (e.g., in the 630-660 nm range) and a blue path $C_B$ for blue light B (e.g., in the 440-470 nm range). The second image light guide 404 has a green path $C_G$ for green light G (e.g., in the 560-520 nm range).

Green light G from the projector 18 that is incident upon the stacked image light guide assembly 400 transmits through the in-coupling diffractive optic IDO1 of the first image light guide 402 and is diffracted at the in-coupling diffractive optic IDO2 of the second image light guide 404. The diffracted green light G is then conveyed via TIR through the second image light guide substrate S2 and directed to the out-coupling diffractive optic ODO2 of the second image light guide 404. Red light R from the projector 16 that is incident upon the stacked image light guide assembly 400 is diffracted at the in-coupling diffractive optic IDO1 of the first image light guide 402. The diffracted red light R is then conveyed via TIR through the first image light guide substrate S1 and directed to the out-coupling diffractive optic ODO1 of the first image light guide 402. Blue light B from the projector 18 that is incident upon the stacked image light guide assembly 400 is diffracted at the in-coupling diffractive optic IDO1 of the first image light guide 402. The diffracted blue light B is then conveyed via TIR through the first image light guide substrate S1 and directed to the out-coupling diffractive optic ODO1 of the first image light guide 402.

Figure 8:
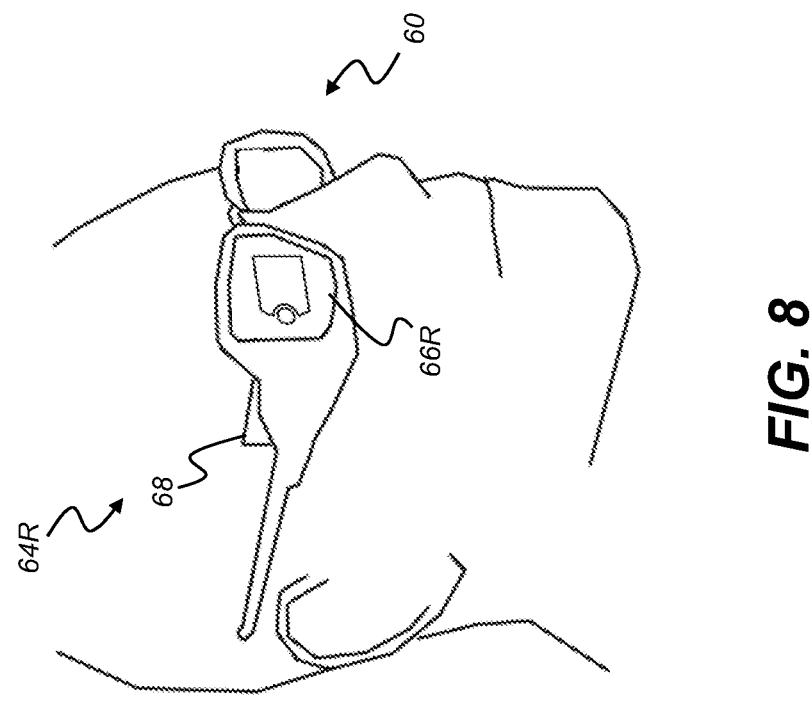
FIG. 8 shows a display system for augmented reality viewing using imaging light guides according to an exemplary embodiment of the presently disclosed subject matter.

The perspective view of FIG. 8 shows a display system 60 for augmented reality viewing using one or more image light guides of the present disclosure. Display system 60 is shown as an HMD with a right-eye optical system 64R having an image light guide 66R for the right eye. The display system 60 includes an image source 68, such as a picoprojector or similar device, energizable to generate an image. In an embodiment, the display system 60 includes a left-eye optical system including one or more image light guides and a second image source. The images that are generated can be a stereoscopic pair of images for 3-D viewing. The virtual image that is formed by the display system 60 can appear to be superimposed or overlaid onto the real-world scene content seen by the viewer through an image light guide 66R. Additional components familiar to those skilled in the augmented reality visualization arts, such as one or more cameras mounted on the frame of the HMD for viewing scene content or viewer gaze tracking, can also be provided.

Figure 10:
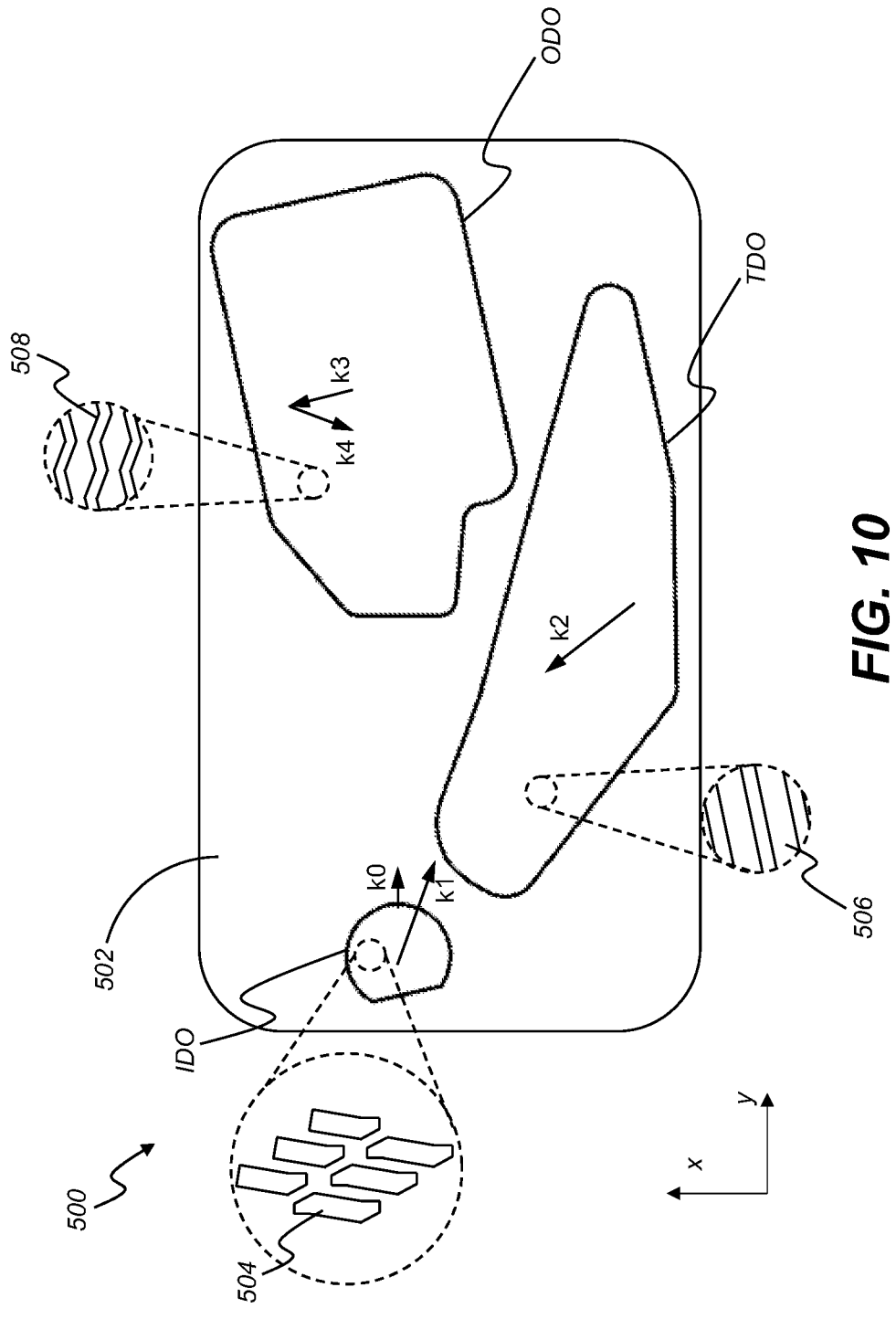
FIG. 10 shows a schematic plan view of an image light guide having an in-coupling diffractive optic with three patterns of periodic diffractive structures according to an exemplary embodiment of the presently disclosed subject matter.

As illustrated in FIG. 10, in an embodiment, an image light guide 500 includes an in-coupling diffractive optic IDO, an intermediate diffractive optic TDO, and an out-coupling diffractive optic ODO formed along a first surface 502 of the image light guide 500. Alternately, one or more of the in-coupling, intermediate, and out-coupling diffractive optics IDO, TDO, ODO can be formed along the second surface of the image light guide 500 located opposite the first surface 502. In an embodiment, the in-coupling diffractive optic IDO comprises a compound pattern of periodic grating structures 504 having a first grating vector k0 and a second grating vector k1 oriented at an angle relative to the first grating vector k0. For example, the in-coupling diffractive optic IDO may comprise a plurality of posts or rows of wavy (e.g., sinusoidal) diffractive elements maximizing the two grating vectors k0, k1.

In an embodiment, the in-coupling diffractive optic IDO is configured to direct a portion of a first wavelength range R of image-bearing light $WG_R$ toward the intermediate diffractive optic TDO, having a third grating vector k2, which is oriented to diffract a portion of the image-bearing light $WG_R$ in a reflective mode toward the out-coupling diffractive optic ODO (see FIG. 3D). Only a portion of the image-bearing light $WG_R$ is diffracted by each of multiple encounters with the intermediate diffractive optic TDO, thereby laterally expanding each of the angularly related beams of the image-bearing light $WG_R$ approaching the out-coupling diffractive optic ODO. In an embodiment, the intermediate diffractive optic TDO includes a pattern of linear grating elements 506.

In an embodiment, the out-coupling diffractive optic ODO includes a compound pattern of periodic grating structures 508 having a fourth grating vector k3 and a fifth grating vector k4. For example, the out-coupling diffractive optic ODO may comprise a plurality of rows of wavy (e.g., sinusoidal) diffractive elements. The in-coupling diffractive optic IDO is configured to direct a portion of a second wavelength range B of image-bearing light $WG_R$ toward the out-coupling diffractive optic ODO, having fourth and fifth grating vectors k3, k4, which is oriented to diffract a portion of the image-bearing light $WG_R$ in a reflective mode to provide pupil expansion, and to out-couple a portion of the image-bearing light $WG_R$ toward an eyebox.

In a first optical path, the image-bearing light $WG_B$ is most efficiently diffracted by portions of the in-coupling diffractive optic IDO periodic grating structures 504 having the second grating vector k1, the intermediate diffractive optic TDO linear grating elements 506 having the third grating vector k2, and the out-coupling diffractive optic ODO compound grating pattern elements 508 having the fifth grating vector k4. The second, third, and fifth grating vectors k1, k2, k4 create a vector summation of substantially zero magnitude. In a second optical path, the image-bearing light $WG_B$ is most efficiently diffracted by portions of the in-coupling diffractive optic IDO periodic grating structures 504 having the first grating vector k0, the out-coupling diffractive optic ODO compound grating pattern elements 508 having the fourth grating vector k3, and the out-coupling diffractive optic ODO compound grating pattern elements 508 having the fifth grating vector k4. The first, fourth, and fifth grating vectors k0, k3, k4 create a vector summation of substantially zero magnitude.

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

The invention claimed is:

1. An image light guide for conveying a virtual image, comprising:
   a substrate operable to propagate image-bearing light beams of a first wavelength range and a second wavelength range;
   an in-coupling diffractive optic formed along the substrate, wherein the in-coupling diffractive optic is operable to diffract the image-bearing light beams of the first wavelength range and the second wavelength range into the substrate in an angularly encoded form;
   an out-coupling diffractive optic formed along the substrate, wherein the out-coupling diffractive optic is operable to expand the image-bearing light beams of the first wavelength range and the second wavelength range and direct the expanded image-bearing light beams of the first wavelength range and the second wavelength range from the substrate in an angularly decoded form;
   wherein the in-coupling diffractive optic comprises first, second, and third pluralities of periodic in-coupling diffractive structures, wherein the first plurality of periodic in-coupling diffractive structures is parallel with an axis, and wherein the second and third pluralities of periodic in-coupling diffractive structures are each nonparallel to the axis;

wherein the out-coupling diffractive optic comprises first, second, and third pluralities of periodic out-coupling diffractive structures, the second and third pluralities of periodic out-coupling diffractive structures having a periodicity substantially equivalent to a periodicity of the second and third pluralities of periodic in-coupling diffractive structures,
   wherein the second and third pluralities of periodic out-coupling diffractive structures are substantially parallel with the second and third pluralities of periodic in-coupling diffractive structures, and
   wherein the first plurality of periodic out-coupling diffractive structures are implicitly defined by the second and third pluralities of periodic out-coupling diffractive structures.

2. The image light guide for conveying a virtual image according to claim 1, wherein the first plurality of periodic in-coupling diffractive structures and the first plurality of periodic out-coupling diffractive structures are configured to diffract image-bearing light in a first wavelength range more efficiently than a second wavelength range.

3. The image light guide for conveying a virtual image according to claim 2, wherein at least one of the second and third pluralities of periodic in-coupling diffractive structures and a corresponding one of the first and second pluralities of periodic out-coupling diffractive structures are configured to diffract image-bearing light in the second wavelength range more efficiently than the first wavelength range.

4. The image light guide for conveying a virtual image according to claim 2, wherein the first wavelength range is red.

5. The image light guide for conveying a virtual image according to claim 2, wherein the second wavelength range is blue.

6. The image light guide for conveying a virtual image according to claim 1, wherein the first, second and third pluralities of periodic in-coupling diffractive structures are bilaterally symmetric along a longitudinal axis of the image light guide.

7. The image light guide for conveying a virtual image according to claim 1, wherein the first plurality of periodic in-coupling diffractive structures is oriented to diffract a portion of the image-bearing light toward a central region of the out-coupling diffractive optic, wherein the second plurality of periodic in-coupling diffractive structures is offset by greater than sixty degrees relative to the first plurality of periodic in-coupling diffractive structures, and wherein the third plurality of periodic in-coupling diffractive structures is offset by greater than negative sixty degrees relative to the first plurality of periodic in-coupling diffractive structures.

8. The image light guide for conveying a virtual image according to claim 1, wherein the second and third pluralities of periodic in-coupling diffractive structures are separated by a period greater than 50 nm relative to the first plurality of periodic in-coupling diffractive structures.

9. The image light guide for conveying a virtual image according to claim 1, wherein one of the first, second and third pluralities of periodic in-coupling diffractive structures comprises a first period and wherein each of the other of the first, second and third pluralities of periodic in-coupling diffractive structures comprises a second period different from the first period, wherein the first period is operable to diffract image-bearing light in a first wavelength range more efficiently than a second wavelength range.

10. The image light guide for conveying a virtual image according to claim 9, wherein the first period is smaller than the second period and operable to diffract image-bearing light of the first wavelength range more efficiently than a second wavelength range.

11. The image light guide for conveying a virtual image according to claim 9, wherein the first period is greater than the second period and operable to diffract image-bearing light of the first wavelength range more efficiently than a second wavelength range.

12. The image light guide for conveying a virtual image according to claim 1, wherein a portion of the out-coupling diffractive optic is located at least partially about the in-coupling diffractive optic, and an arcuate space is located between the in-coupling diffractive optic and the out-coupling diffractive optic, wherein the arcuate space does not include any periodic diffractive structures.

13. The image light guide for conveying a virtual image according to claim 1, further comprising an intermediate diffractive optic located in an optical path between the in-coupling diffractive optic and the out-coupling diffractive optic, wherein the intermediate diffractive optic includes two pluralities of periodic diffractive structures parallel with the second and third pluralities of periodic in-coupling diffractive structures, and wherein a portion of the intermediate diffractive optic is located at least partially about the in-coupling diffractive optic, and wherein an arcuate space is located between the in-coupling diffractive optic and the intermediate diffractive optic, wherein the arcuate space does not include any periodic diffractive structures.

14. The image light guide for conveying a virtual image according to claim 13, wherein a second space is located between the intermediate diffractive optic and the out-coupling diffractive optic, wherein the second space does not include any periodic diffractive structures.

15. The image light guide for conveying a virtual image according to claim 1, wherein the in-coupling diffractive optic is operable to diffract a portion of the image-bearing light beams into the substrate within an incident angular range.

16. The image light guide for conveying a virtual image according to claim 1, wherein the image light guide comprises optical paths whereby image-bearing light of the first wavelength range is incident upon the in-coupling diffractive optic at an incident angular range, wherein a first portion of the image-bearing light of the first wavelength range propagates within the substrate, is incident upon the first plurality of periodic out-coupling diffractive structures and is out-coupled, and wherein a second portion of the image-bearing light of the first wavelength range further propagates and is incident upon either or both of the second and third plurality of periodic out-coupling diffractive structures.

17. The image light guide for conveying a virtual image according to claim 16, wherein the incident angular range is between zero and approximately 60 degrees from a surface normal of the image light guide.

18. The image light guide for conveying a virtual image according to claim 16, wherein the second portion of the image-bearing light of the first wavelength range is out-coupled after an even number of incidents of the image-bearing light of the first wavelength range upon the first, second, or third pluralities of periodic out-coupling diffractive structures.

19. The image light guide for conveying a virtual image according to claim 1, wherein the image light guide comprises an optical path whereby image-bearing light of the second wavelength range is operable to propagate within the substrate, the optical path comprising the second and third pluralities of periodic in-coupling diffractive structures, the second plurality of periodic out-coupling diffractive structures, and the third plurality of periodic out-coupling diffractive structures.

20. The image light guide for conveying a virtual image according to claim 19, wherein a portion of the image-bearing light of the second wavelength range is outcoupled after an even number of incidents of the image-bearing light of the second wavelength range upon the second and third pluralities of periodic out-coupling diffractive structures.

21. The image light guide for conveying a virtual image according to claim 1, wherein the substrate is a first substrate in a stacked image light guide assembly, and a second substrate operable to propagate image-bearing light beams along a length thereof is coupled with the first substrate, wherein the first and second substrates comprise three or more optical paths for at least three wavelength ranges.

22. An image light guide for conveying a virtual image, comprising:
   a substrate operable to propagate image-bearing light beams of a first wavelength range and a second wavelength range;
   an in-coupling diffractive optic formed along the substrate, wherein the in-coupling diffractive optic is operable to diffract the image-bearing light beams of the first wavelength range and the second wavelength range from an image source into the substrate in an angularly encoded form;
   an out-coupling diffractive optic formed along the substrate, wherein the out-coupling diffractive optic is operable to expand the image-bearing light beams of the first wavelength range and the second wavelength range and direct the expanded image-bearing light beams of the first wavelength range and the second wavelength range from the substrate in an angularly decoded form;
   wherein the in-coupling diffractive optic and the out-coupling diffractive optic are configured as a single continuous diffractive pattern having a first plurality of periodic diffractive structures, and a second plurality of periodic diffractive structures positioned at an angle less than 60° relative to the first plurality of periodic diffractive structures, and
   wherein the in-coupling diffractive optic comprises a third plurality of periodic diffractive structures.

23. The image light guide for conveying a virtual image according to claim 22, wherein the first and second pluralities of periodic diffractive structures of the in-coupling diffractive optic have a greater depth than the first and second pluralities of periodic diffractive structures of the out-coupling diffractive optic, and wherein the out-coupling diffractive optic further comprises a third plurality of periodic diffractive structures, wherein the third plurality of periodic diffractive structures of the out-coupling diffractive optic have a lesser depth than the first and second pluralities of periodic diffractive structures of the out-coupling diffractive optic.

24. An image light guide for conveying a virtual image, comprising:
   a substrate operable to propagate image-bearing light beams of a first wavelength range and a second wavelength range;
   an in-coupling diffractive optic formed along the substrate, wherein the in-coupling diffractive optic is operable to diffract the image-bearing light beams of the first wavelength range and the second wavelength range from an image source into the substrate in an angularly encoded form;

an out-coupling diffractive optic formed along the substrate, wherein the out-coupling diffractive optic is operable to expand the image-bearing light beams of the first wavelength range and the second wavelength range and output expanded image-bearing light beams of the first wavelength range and the second wavelength range from the substrate in an angularly decoded form;

an intermediate diffractive optic formed along the substrate, wherein the intermediate diffractive optic is operable to expand the image-bearing light beams of the second wavelength range and direct the expanded image-bearing light beams of the second wavelength range toward the out-coupling diffractive optic;

wherein the in-coupling diffractive optic comprises periodic diffractive structures having a first grating vector and a second grating vector, and wherein the periodic diffractive structures having a first grating vector are configured to direct the image-bearing light beams of the first wavelength range from the in-coupling diffractive optic toward the out-coupling diffractive optic;

wherein the intermediate diffractive optic comprises a periodic diffractive structure having a third grating vector;

wherein the out-coupling diffractive optic comprises periodic diffractive structures having fourth, fifth and sixth grating vectors.

25. An image light guide for conveying a virtual image, comprising:

a substrate operable to propagate image-bearing light beams of a first wavelength range and a second wavelength range;

an in-coupling diffractive optic formed along the substrate, wherein the in-coupling diffractive optic is operable to diffract the image-bearing light beams of the first wavelength range and the second wavelength range into the substrate in an angularly encoded form;

an out-coupling diffractive optic formed along the substrate, wherein the out-coupling diffractive optic is operable to expand the image-bearing light beams of the first wavelength range and the second wavelength range and direct the expanded image-bearing light beams of the first wavelength range and the second wavelength range from the substrate in an angularly decoded form;

wherein the in-coupling diffractive optic comprises first, second, and third pluralities of periodic in-coupling diffractive structures, wherein the first plurality of periodic in-coupling diffractive structures is parallel with an axis, and wherein the second and third pluralities of periodic in-coupling diffractive structures are each nonparallel to the axis;

wherein the out-coupling diffractive optic comprises first, second, and third pluralities of periodic out-coupling diffractive structures, the second and third pluralities of periodic out-coupling diffractive structures having a periodicity substantially equivalent to a periodicity of the second and third pluralities of periodic in-coupling diffractive structures, wherein the second and third pluralities of periodic out-coupling diffractive structures are substantially parallel with the second and third pluralities of periodic in-coupling diffractive structures, and wherein a portion of the out-coupling diffractive optic is located at least partially about the in-coupling diffractive optic, and an arcuate space is located between the in-coupling diffractive optic and the out-coupling diffractive optic, wherein the arcuate space does not include any periodic diffractive structures.

* * * * *